US012505846B2

(12) United States Patent
Briand et al.

(10) Patent No.: US 12,505,846 B2
(45) **Date of Patent: *Dec. 23, 2025**

(54) DETERMINING THE INTER-CHANNEL TIME DIFFERENCE OF A MULTI-CHANNEL AUDIO SIGNAL

(71) Applicant: Telefonaktiebolaget LM Ericsson (publ), Stockholm (SE)

(72) Inventors: Manuel Briand, Nice (FR); Tomas Jansson Toftgård, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,164

(22) Filed: Jan. 15, 2020

(65) Prior Publication Data

US 2020/0152210 A1 May 14, 2020

Related U.S. Application Data

(63) Continuation of application No. 16/410,494, filed on May 13, 2019, now Pat. No. 10,573,328, which is a (Continued)

(51) Int. Cl.
*G10L 19/008* (2013.01)
*G10L 19/20* (2013.01)

(Continued)

(52) U.S. Cl.
CPC ............ *G10L 19/008* (2013.01); *G10L 19/20* (2013.01); *H04S 3/008* (2013.01); *H04S 7/00* (2013.01);

(Continued)

(58) Field of Classification Search
CPC ....... G10L 19/008; G10L 19/20; H04S 3/008; H04S 7/00; H04S 5/00; H04S 2420/01; H04S 2420/03; H04R 2499/11
See application file for complete search history.

(56) References Cited

U.S. PATENT DOCUMENTS 7,822,617 B2 10/2010 Taleb et al.
2006/0004583 A1 1/2006 Herre et al.

(Continued)

FOREIGN PATENT DOCUMENTS

WO WO 2006091150 A1 8/2006
WO WO 2006108456 A1 10/2006

(Continued)

OTHER PUBLICATIONS

International Search Report, Application No. PCT/SE2011/050423, Jan. 18, 2012.
Written Opinion of the International Searching Authority, Application No. PCT/SE2011/050423, mailed Jan. 18, 2012.
International Preliminary Report on Patentability, Application No. PCT/SE2011/050423, Aug. 6, 2013.
Supplementary European Search Report—European Patent Application No. 11 857 874.9-1910, mailed Sep. 18, 2014, 5 pages.

(Continued)

*Primary Examiner* — David L Ton
(74) *Attorney, Agent, or Firm* — Sage Patent Group

(57) ABSTRACT

A method and device are disclosed for determining an inter-channel time difference of a multi-channel audio signal having at least two channels. A determination is made at a number of consecutive time instances, inter-channel correlation based on a cross-correlation function involving at least two different channels of the multi-channel audio signal. Each value of the inter-channel correlation is associated with a corresponding value of the inter-channel time difference. An adaptive inter-channel correlation threshold is adaptively determined based on adaptive smoothing of the inter-channel correlation in time. A current value of the inter-channel correlation is then evaluated in relation to the adaptive inter-channel correlation threshold to determine whether the corresponding current value of the inter-channel time difference is relevant. Based on the result of this evaluation, an updated value of the inter-channel time difference is determined.

20 Claims, 14 Drawing Sheets

Related U.S. Application Data continuation of application No. 15/350,934, filed on Nov. 14, 2016, now Pat. No. 10,332,529, which is a continuation of application No. 15/073,068, filed on Mar. 17, 2016, now Pat. No. 9,525,956, which is a continuation of application No. 13/980,427, filed as application No. PCT/SE2011/050423 on Apr. 7, 2011, now Pat. No. 9,424,852.

(60) Provisional application No. 61/438,720, filed on Feb. 2, 2011.

(51) Int. Cl.
*H04S 3/00* (2006.01)
*H04S 7/00* (2006.01)

(52) U.S. Cl.
CPC ....... *H04R 2499/11* (2013.01); *H04S 2420/01* (2013.01); *H04S 2420/03* (2013.01)

(56) References Cited

U.S. PATENT DOCUMENTS

| | | | |
|---|---|---|---|
| 2006/0106620 | A1 | 5/2006 | Thompson et al. |
| 2011/0103591 | A1 | 5/2011 | Ojala |
| 2011/0255714 | A1 | 10/2011 | Neusinger et al. |

FOREIGN PATENT DOCUMENTS

| | | | |
|---|---|---|---|
| WO | WO 2010000313 | A1 | 1/2010 |
| WO | WO 2010115850 | A1 | 10/2010 |

OTHER PUBLICATIONS

Abutalebi et al.: "Performance Improvement of TDOA-Based Speaker Localization in Joint Noisy and Reverberant Conditions", Hindawi Publishing Corp., EURASIP Journal on Advances in Signal Processing vol. 65, No. 12, Jan. 14, 2011, Article ID 621390, 13 pp.
Faller: "Parametric Coding of Spatial Audio", These No. 3062 (2004) Presentee a la faculte informatique et communications, section des systems de communication Ecole Polythechnique Federale de Lausanne, Switzerland (EPFL), Lausanne, Switzerland, PhD Thesis, Chapter 7, Section 7.2.3, pp. 113-114.
Guvene et al: "Threshold-Based TOA Estimation for Impulse Radio UWB Systems", ULTRA-WIDEBAND, 2005 IEEE International Conference on Zurich, Switzerland Sep. 5-8, 2005, Piscataway, NJ, Sep. 5, 2005, pp. 420-425, XP010873336.
Jansson: "Stereo coding for the ITU-T G.719 codec", Uppsala universitet, Teknisk-naturvetenskapliga vetenskapsomradet, Tekniska sektionen, Institutionen for teknikvetenskaper, Signaler och System, ISSN 1401-5757, May 17, 2011; pp. 78-91.
Pfau et al.: "Multispeaker speech activity detection for the ICSI meeting recorder", Automatic Speech Recognition and Understanding, 2001. ASRU '01. IEEE Workshop On Dec. 9-13, 2011, Piscataway, NJ, Dec. 9, 2001, pp. 107-110. XP010603688.
Tournery et a.: "Improved Time Delay Analysis/Synthesis for Parametric Stereo Audio Coding" Proceeding 6753, Audio Engineering Society, Convention Paper, Presented at the 120th Convention May 20-23, 2006 Paris, France.
Varma et al: "Robust TDE-based DOA estimation for compact audio arrays", Sensor Array and Multichannel Signal Processing Workshop Proceedings, Aug. 4-6, 2002, Piscataway, NJ, Aug. 4, 2002, pp. 214-218, XP010635741.

Signal-to-Noise Ratio (SNR)
dB
L
R

Variable ICTD (sine function) over time
time (frame index)

ICC - Global maximum of the CCF (cross-correlation coefficient)
ICC
Adaptive ICC limit ICTD extracted from the global maximum of the CCF
ICTD extracted using the Adaptive ICC Limitation
time (frame index)

*Fig. 9A*
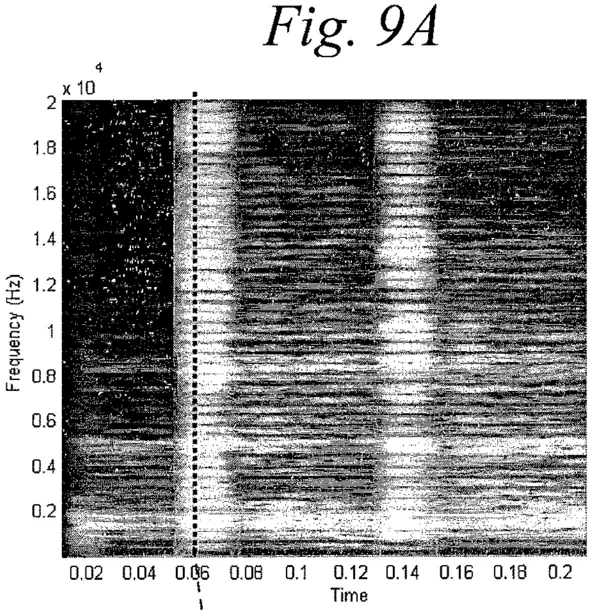
*Fig. 9B*
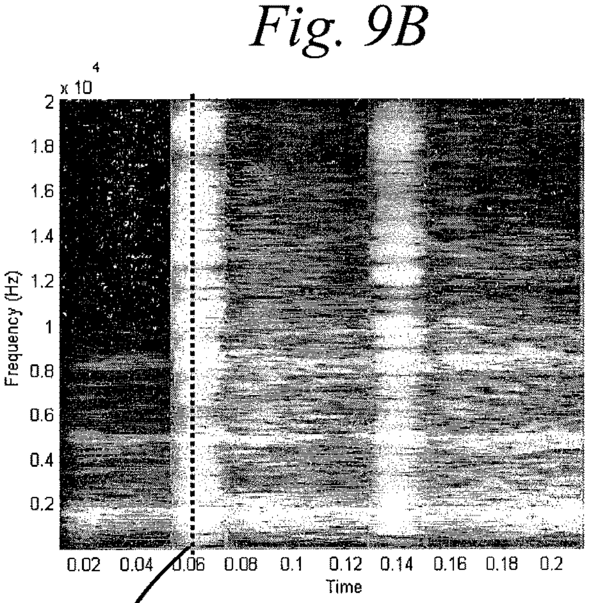
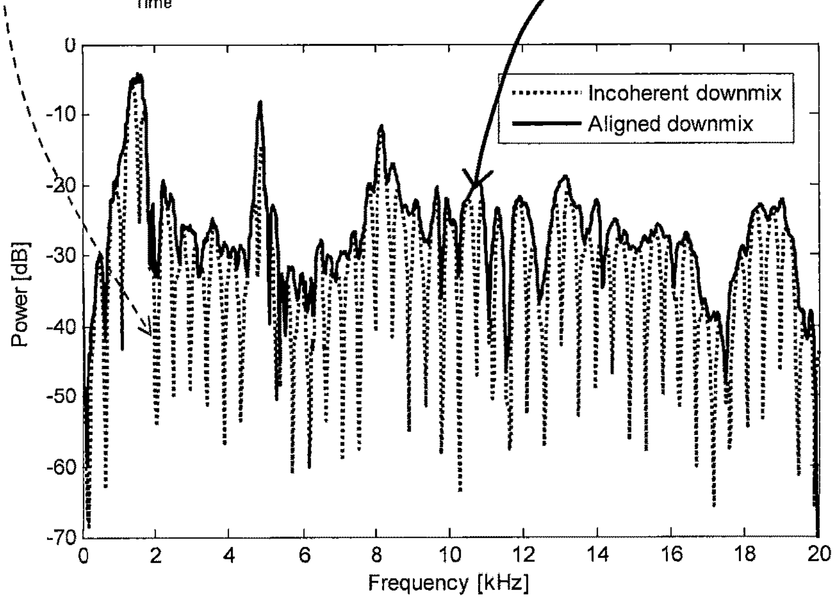
*Fig. 9C*

DETERMINING THE INTER-CHANNEL TIME DIFFERENCE OF A MULTI-CHANNEL AUDIO SIGNAL

CROSS REFERENCE TO RELATED APPLICATIONS

This application is a continuation of U.S. patent application Ser. No. 16/410,494, filed May 13, 2019, which itself is a continuation of U.S. patent application Ser. No. 15/350,934, filed Nov. 14, 2016, now U.S. Pat. No. 10,332,529, which itself is a continuation of U.S. patent application Ser. No. 15/073,068, filed Mar. 17, 2016, now U.S. Pat. No. 9,525,956, which itself is a continuation of U.S. patent application Ser. No. 13/980,427, filed on Jul. 18, 2013, now U.S. Pat. No. 9,424,852, which itself is a 35 U.S.C. § 371 national stage application of PCT International Application No. PCT/SE2011/050423, filed on Apr. 7, 2011, and which itself claims the benefit of U.S. provisional Patent Application No. 61/438,720, filed Feb. 2, 2011, the disclosures and contents of each of which are incorporated by reference herein in their entirety. The above-referenced PCT International Application was published in the English language as International Publication No. WO 2012/105885 A1 on Aug. 9, 2012.

TECHNICAL FIELD

The present technology generally relates to the field of audio encoding and/or decoding and the issue of determining the inter-channel time difference of a multi-channel audio signal.

BACKGROUND

Spatial or 3D audio is a generic formulation which denotes various kinds of multi-channel audio signals. Depending on the capturing and rendering methods, the audio scene is represented by a spatial audio format. Typical spatial audio formats defined by the capturing method (microphones) are for example denoted as stereo, binaural, ambisonics, etc. Spatial audio rendering systems (headphones or loudspeakers) often denoted as surround systems are able to render spatial audio scenes with stereo (left and right channels 2.0) or more advanced multi-channel audio signals (2.1, 5.1, 7.1, etc.).

Recently developed technologies for the transmission and manipulation of such audio signals allow the end user to have an enhanced audio experience with higher spatial quality often resulting in a better intelligibility as well as an augmented reality. Spatial audio coding techniques generate a compact representation of spatial audio signals which is compatible with data rate constraint applications such as streaming over the internet for example. The transmission of spatial audio signals is however limited when the data rate constraint is too strong and therefore post-processing of the decoded audio channels is also used to enhanced the spatial audio playback. Commonly used techniques are for example able to blindly up-mix decoded mono or stereo signals into multi-channel audio (5.1 channels or more).

In order to efficiently render spatial audio scenes, these spatial audio coding and processing technologies make use of the spatial characteristics of the multi-channel audio signal. In particular, the time and level differences between the channels of the spatial audio capture such as the Inter-Channel Time Difference ICTD and the Inter-Channel Level Difference ICLD are used to approximate the interaural cues such as the Interaural Time Difference ITD and Interaural Level Difference ILD which characterize our perception of sound in space. The term "cue" is used in the field of sound localization, and normally means parameter or descriptor. The human auditory system uses several cues for sound source localization, including time- and level differences between the ears, spectral information, as well as parameters of timing analysis, correlation analysis and pattern matching.

FIG. 1 illustrates the underlying difficulty of modeling spatial audio signals with a parametric approach. The Inter-Channel Time and Level Differences (ICTD and ICLD) are commonly used to model the directional components of multi-channel audio signals while the Inter-Channel Correlation ICC—that models the InterAural Cross-Correlation IACC—is used to characterize the width of the audio image. Inter-Channel parameters such as ICTD, ICLD and ICC are thus extracted from the audio channels in order to approximate the ITD, ILD and IACC which model our perception of sound in space. Since the ICTD and ICLD are only an approximation of what our auditory system is able to detect (ITD and ILD at the ear entrances), it is of high importance that the ICTD cue is relevant from a perceptual aspect.

FIG. 2 is a schematic block diagram showing parametric stereo encoding/decoding as an illustrative example of multi-channel audio encoding/decoding. The encoder 10 basically comprises a downmix unit 12, a mono encoder 14 and a parameters extraction unit 16. The decoder 20 basically comprises a mono decoder 22, a decorrelator 24 and a parametric synthesis unit 26. In this particular example, the stereo channels are down-mixed by the downmix unit 12 into a sum signal encoded by the mono encoder 14 and transmitted to the decoder 20, 22 as well as the spatial quantized (sub-band) parameters extracted by the parameters extraction unit 16 and quantized by the quantizer Q. The spatial parameters may be estimated based on the sub-band decomposition of the input frequency transforms of the left and the right channel. Each sub-band is normally defined according to a perceptual scale such as the Equivalent Rectangular Bandwidth—ERB. The decoder and the parametric synthesis unit 26 in particular performs a spatial synthesis (in the same sub-band domain) based on the decoded mono signal from the mono decoder 22, the quantized (sub-band) parameters transmitted from the encoder 10 and a decorrelated version of the mono signal generated by the decorrelator 24. The reconstruction of the stereo image is then controlled by the quantized sub-band parameters. Since these quantized sub-band parameters are meant to approximate the spatial or interaural cues, it is very important that the Inter-Channel parameters (ICTD, ICLD and ICC) are extracted and transmitted according to perceptual considerations so that the approximation is acceptable for the auditory system.

Stereo and multi-channel audio signals are often complex signals difficult to model especially when the environment is noisy or when various audio components of the mixtures overlap in time and frequency i.e. noisy speech, speech over music or simultaneous talkers, and so forth.

Reference can for example be made to FIGS. 3A-B (clean speech analysis) and FIGS. 4A-B (noisy speech analysis) showing the decrease of the Cross-Correlation Function (CCF), which is typically normalized to the interval between −1 and 1, when interfering noise is mixed with the speech signal.

FIG. 3A illustrates an example of the waveforms for the left and right channels for "clean speech". FIG. 3B illustrates a corresponding example of the Cross-Correlation Function between a portion of the left and right channels.

FIG. 4A illustrates an example of the waveforms for the left and right channels made up of a mixture of clean speech and artificial noise. FIG. 4B illustrates a corresponding example of the Cross-Correlation Function between a portion of the left and right channels.

The background noise has comparable energy to the speech signal as well as low correlation between the left and the right channels, and therefore the maximum of the CCF is not necessarily related to the speech content in such environmental conditions. This results in an inaccurate modeling of the speech signal which generates instability in the stream of extracted parameters. In that case, the time shift or delay (ICTD) that maximizes the CCF is irrelevant with respect to the maximum of the CCF i.e. Inter-Channel Correlation or Coherence (ICC). Such environmental conditions are frequently observed outdoors, in a car or even in an office environment with computer fans and so forth. This phenomenon requires extra precautions in order to provide a reliable and stable estimation of the Inter-Channel Time Difference (ICTD).

Voice activity detection or more precisely the detection of tonal components within the stereo channels is used in [1] to adapt the update rate of the ICTD over time. The ICTD is extracted on a time-frequency grid i.e. using a sliding analysis-window and sub-band frequency decomposition. The ICTD is smoothed over time according to the combination of the tonality measure and the level of correlation between the channels according to the ICC cue. The algorithm allows for a strong smoothing of the ICTD when the signal is detected as tonal and an adaptive smoothing of the ICTD using the ICC as a forgetting factor when the tonality measure is low. While the smoothing of the ICTD for exactly tonal components is acceptable, the use of a forgetting factor when the signals are not exactly tonal is questionable. Indeed, the lower the ICC cue, the stronger the smoothing of the ICTD, which makes the ICTD extraction very approximate and problematic especially when source(s) are moving in space. The assumption that a "low" ICC allows for a smoothing of the ICTD is not always true and is highly dependent on the environmental conditions i.e. level of noise, reverberation, background components etc. In other words, the algorithm described in [1] using smoothing of the ICTD over time does not allow for a precise tracking of the ICTD, especially not when the signal characteristics (ICC, ICTD and ICLD) evolve quickly in time.

There is a general need for an improved extraction or determination of the inter-channel time difference ICTD.

SUMMARY

It is a general object to provide a better way to determine or estimate an inter-channel time difference of a multi-channel audio signal having at least two channels.

It is also an object to provide improved audio encoding and/or audio decoding including improved estimation of the inter-channel time difference.

These and other objects are met by embodiments as defined by the accompanying patent claims.

In a first aspect, there is provided a method for determining an inter-channel time difference of a multi-channel audio signal having at least two channels. A basic idea is to determine, at a number of consecutive time instances, inter-channel correlation based on a cross-correlation function involving at least two different channels of the multi-channel audio signal. Each value of the inter-channel correlation is associated with a corresponding value of the inter-channel time difference. An adaptive inter-channel correlation threshold is adaptively determined based on adaptive smoothing of the inter-channel correlation in time. A current value of the inter-channel correlation is then evaluated in relation to the adaptive inter-channel correlation threshold to determine whether the corresponding current value of the inter-channel time difference is relevant. Based on the result of this evaluation, an updated value of the inter-channel time difference is determined.

In this way, the determination of the inter-channel time difference is significantly improved. In particular, a better stability of the determined inter-channel time difference is obtained.

In another aspect, there is provided an audio encoding method comprising such a method for determining an inter-channel time difference.

In yet another aspect, there is provided an audio decoding method comprising such a method for determining an inter-channel time difference.

In a related aspect, there is provided a device for determining an inter-channel time difference of a multi-channel audio signal having at least two channels. The device comprises an inter-channel correlation determiner configured to determine, at a number of consecutive time instances, inter-channel correlation based on a cross-correlation function involving at least two different channels of the multi-channel audio signal. Each value of the inter-channel correlation is associated with a corresponding value of the inter-channel time difference. The device also comprises an adaptive filter configured to perform adaptive smoothing of the inter-channel correlation in time, and a threshold determiner configured to adaptively determine an adaptive inter-channel correlation threshold based on the adaptive smoothing of the inter-channel correlation. An inter-channel correlation evaluator is configured to evaluate a current value of inter-channel correlation in relation to the adaptive inter-channel correlation threshold to determine whether the corresponding current value of the inter-channel time difference is relevant. An inter-channel time difference determiner is configured to determine an updated value of the inter-channel time difference based on the result of this evaluation.

In another aspect, there is provided an audio encoder comprising such a device for determining an inter-channel time difference.

In still another aspect, there is provided an audio decoder comprising such a device for determining an inter-channel time difference.

Other advantages offered by the present technology will be appreciated when reading the below description of embodiments.

BRIEF DESCRIPTION OF THE DRAWINGS

The embodiments, together with further objects and advantages thereof, may best be understood by making reference to the following description taken together with the accompanying drawings, in which:

FIGS. 9A-C are schematic diagrams illustrating an example of how alignment of the input channels according to the ICTD can avoid the comb-filtering effect and energy loss during the down-mix procedure.

DETAILED DESCRIPTION

Throughout the drawings, the same reference numbers are used for similar or corresponding elements.

Figure 5:
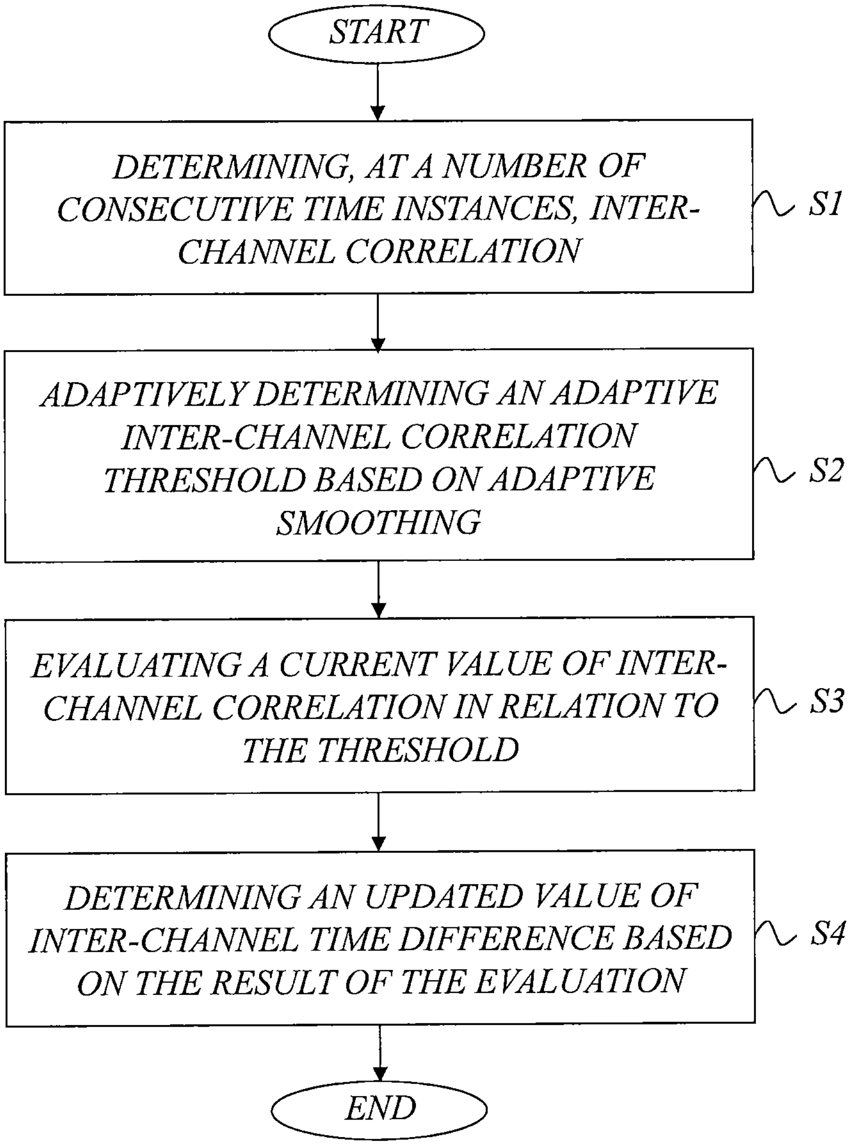
FIG. 5 is a schematic flow diagram illustrating an example of a basic method for determining an inter-channel time difference of a multi-channel audio signal having at least two channels according to an embodiment.

An example of a basic method for determining an inter-channel time difference of a multi-channel audio signal having at least two channels will now be described with reference to the illustrative flow diagram of FIG. 5.

Step S1 includes determining, at a number of consecutive time instances, inter-channel correlation, ICC, based on a cross-correlation function involving at least two different channels of the multi-channel audio signal, wherein each value of the inter-channel correlation is associated with a corresponding value of the inter-channel time difference, ICTD.

This could for example be a cross-correlation function of two or more different channels, normally a pair of channels, but could also be a cross-correlation function of different combinations of channels. More generally, this could be a cross-correlation function of a set of channel representations including at least a first representation of one or more channels and a second representation of one or more channels, as long as at least two different channels are involved overall.

Step S2 includes adaptively determining an adaptive inter-channel correlation ICC threshold based on adaptive smoothing of the inter-channel correlation in time. Step S3 includes evaluating a current value of inter-channel correlation in relation to the adaptive inter-channel correlation threshold to determine whether the corresponding current value of the inter-channel time difference ICTD is relevant. Step S4 includes determining an updated value of the inter-channel time difference based on the result of this evaluation.

It is common that one or more channel pairs of the multi-channel signal are considered, and there is normally a CCF for each pair of channels and an adaptive threshold for each analyzed pair of channels. More generally, there is a CCF and an adaptive threshold for each considered set of channel representations.

Now, reference to FIG. 14 will be made. If the current value of the inter-channel time difference is determined to be relevant (YES), the current value will normally be taken into account in step S4-1 when determining the updated value of the inter-channel time difference. If the current value of the inter-channel time difference is not relevant (NO), it should normally not be used when determining the updated value of the inter-channel time difference. Instead, one or more previous values of the ICTD can be used in step S4-2 to update the ICTD.

In other words, the purpose of the evaluation in relation to the adaptive inter-channel correlation threshold is typically to determine whether or not the current value of the inter-channel time difference should be used when determining the updated value of the inter-channel time difference.

In this way, and by using an adaptive inter-channel correlation threshold, improved stability of the inter-channel time difference is obtained.

For example, when the current inter-channel correlation ICC is low (i.e. ICC below adaptive ICC threshold), it is generally not desirable to use the corresponding current inter-channel time difference. However, when the correlation is high (i.e. ICC above adaptive ICC threshold), the current inter-channel time difference should be taken into account when updating the inter-channel time difference.

By way of example, when the current value of the ICC is sufficiently high (i.e. relatively high correlation) the current value of the ICTD may be selected as the updated value of inter-channel time difference.

Figure 14:
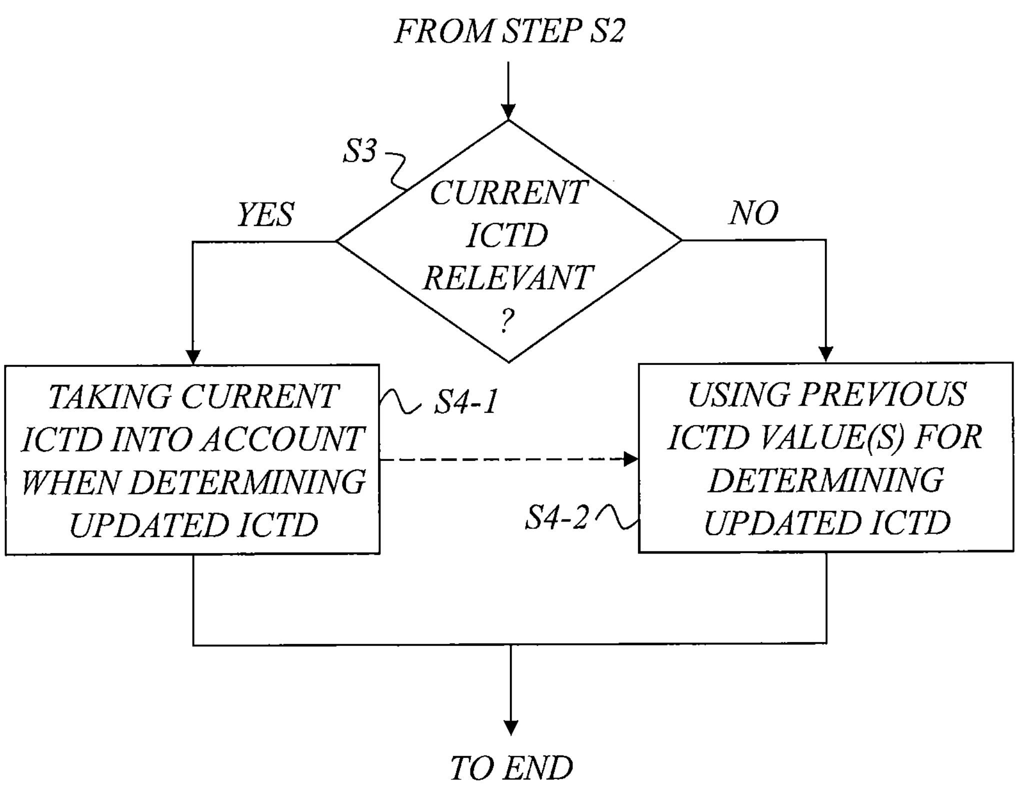
FIG. 14 is a schematic flow diagram illustrating an example of determining an updated ICTD value depending on whether or not the current ICTD value is relevant according to an embodiment.

Alternatively, the current value of the ICTD may be used together with one or more previous values of the inter-channel time difference to determine the updated inter-channel time difference (see dashed arrow from step S4-1 to step S4-2 in FIG. 14). In an example embodiment, it is possible to determine a combination of several inter-channel time difference values according to the values of the inter-channel correlation, with a weight applied to each inter-channel time difference value being a function of the inter-channel correlation at the same time instant. For example, one could imagine a combination of several ICTDs according to the values of ICCs such as:

$$ICTD[n] = \sum_{m=0}^{M}\left(\left[\frac{ICC[n-m]}{\sum_{m=0}^{M} ICC[n-m]}\right] \times ICTD[n-m]\right)$$

where n is the current time index, and the sum is performed over the past values using the index m=0, . . . , M, with:

$$\sum_{m=0}^{M}\left[\frac{ICC[n-m]}{\sum_{m=0}^{M} ICC[n-m]}\right] = 1.$$

In this particular example, the idea is that the weight applied to each ICTD is function of the ICC at the same time instant.

When the current value of the ICC is not sufficiently high (i.e. relatively low correlation) the current value of the ICTD is deemed not relevant (NO in FIG. 14) and therefore should not be considered, and instead one or more previous (historical) values of the ICTD are used for updating the inter-channel time difference (see step S4-2 in FIG. 14). For example, a previous value of inter-channel time difference may be selected (kept) as the inter-channel time difference. In this way, the stability of the inter-channel time difference will be preserved. In a more elaborate example, one could imagine a combination of past values of the ICTD as follows:

$$ICTD[n] = \sum_{m=1}^{M}\left(\left[\frac{ICC[n-m]}{\sum_{m=1}^{M} ICC[n-m]}\right] \times ICTD[n-m]\right)$$

where n is the current time index, and the sum is performed over the past values using the index m=1, . . . , M (note that m is starting at 1), with:

$$\sum_{m=0}^{M}\left[\frac{ICC[n-m]}{\sum_{m=0}^{M} ICC[n-m]}\right] = 1.$$

Figure 6A:
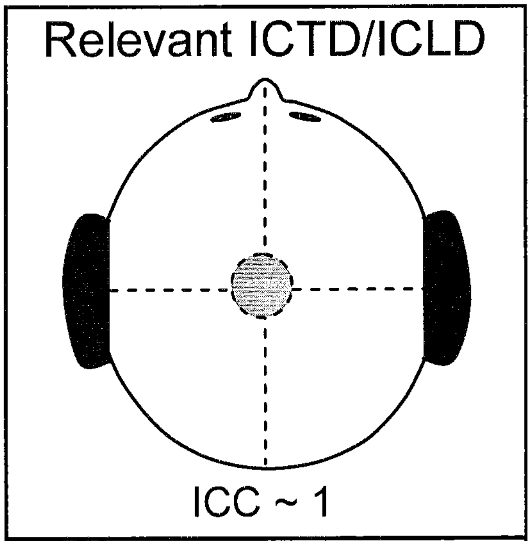
FIGS. 6A-C are schematic diagrams illustrating the problem of characterizing the ICC so that the ICTD (and ICLD) are relevant.
Figure 6B:
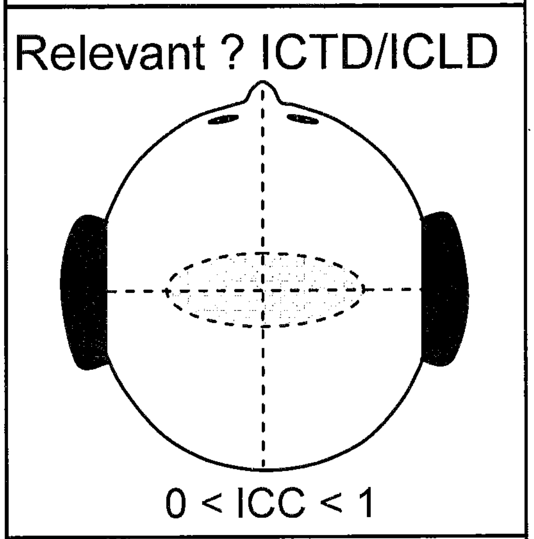
Figure 6C:
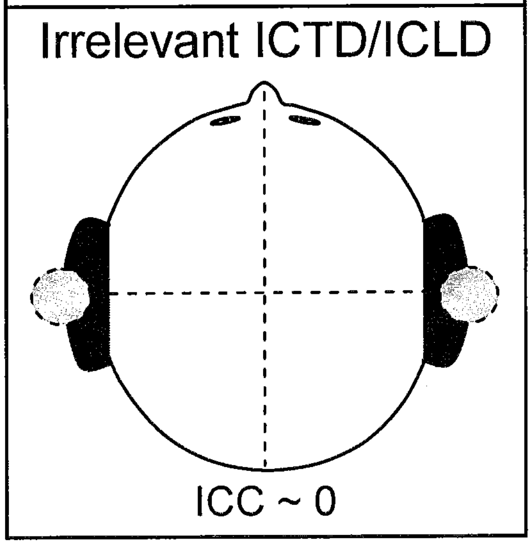

In some sense, the ICTD is considered as a spatial cue part of a set of spatial cues (ICC, ICTD and ICLD) that altogether have a perceptual and coherent relevancy. It is therefore assumed that the ICTD cue is only perceptually relevant when the ICC is relatively high according to the multi-channel audio signal characteristics. FIGS. 6A-C are schematic diagrams illustrating the problem of characterizing the ICC so that the ICTD (and ICLD) is/are relevant and related to a coherent source in the mixtures. The word “directional” could also be used since the ICTD and ICLD are spatial cues related to directional sources while the ICC is able to characterize the diffuse components of the mixtures.

The ICC may be determined as a normalized cross-correlation coefficient and then has a range between zero and one. On one hand, an ICC of one indicates that the analyzed channels are coherent and that the corresponding extracted ICTD means that the correlated components in both channels are indeed potentially delayed. On the other hand, an ICC close to zero means that the analyzed channels have different sound components which cannot be considered as delayed at least not in the range of an approximated ITD, i.e. few milliseconds.

An issue is basically how efficiently the ICC can control the relevancy of the ICTD, especially since the ICC cue is highly dependent on the environmental sounds that constitute the mixtures of the multi-channel audio signals. The idea is thus to take this into account while evaluating the relevancy of the ICTD cue. This results in a perceptually relevant ICTD cue selection based on an adaptive ICC criterion. Rather than evaluating the amount of correlation (ICC) to a fix threshold as proposed in [2], it will rather be beneficial to introduce an adaptation of the ICC limitation according to the evolution of the signal characteristics, as will be exemplified later on.

In a particular example, the current value ICTD[i] of the inter-channel time difference is selected if the current value ICC[i] of the inter-channel correlation is (equal to or) larger than the current value AICCL[i] of the adaptive inter-channel correlation limitation/threshold, and a previous value ICTD[i−1] of the inter-channel time difference is selected if the current value ICC[i] of the inter-channel correlation is smaller than the current value AICCL[i] of the adaptive inter-channel correlation limitation/threshold:

$$\begin{cases} ICTD[i] = ICTD[i,] \mid ICC[i] \geq AICCL[i] \\ ICTD[i] = ICTD[i-1] \mid ICC[i] < AICCL[i] \end{cases}$$

where AICCL[i] is determined based on values, such as ICC[i] and ICC[i−1], of the inter-channel correlation at two or more different time instances. The index i is used for denoting different time instances in time, and may refer to samples or frames. In other words, the processing may for example be performed frame-by-frame or sample-by-sample.

This also means that when the inter-channel correlation is low (i.e. below the adaptive threshold), the inter-channel time difference extracted from the global maximum of the cross-correlation function will not be considered.

It should be understood that the present technology is not limited to any particular way of estimating the ICC. In principle, any state-of-the-art method giving acceptable results can be used. The ICC can be extracted either in the time or in the frequency domain using cross-correlation techniques. For example the GCC for the conventional generalized cross-correlation method is one possible method that is well established. Other ways of determining the ICC that are reasonable in terms of complexity and robustness of the estimation will be described later on. The inter-channel correlation ICC is normally determined as a maximum of an energy-normalized cross-correlation function.

Figure 15:
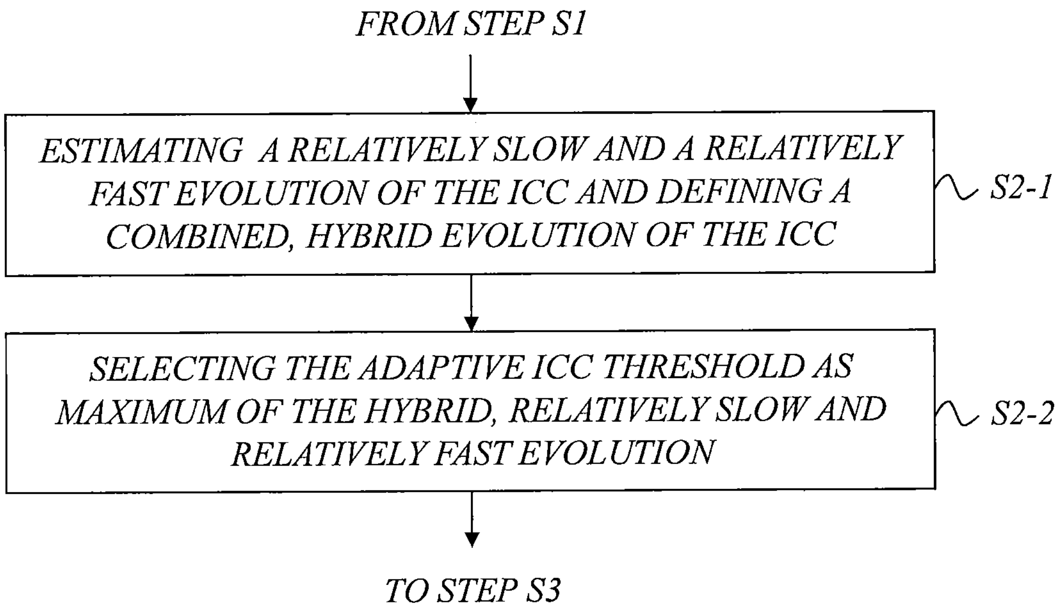
FIG. 15 is a schematic flow diagram illustrating an example of adaptively determining an adaptive inter-channel correlation threshold according to an example embodiment.

In another embodiment, as illustrated in the example of FIG. 15, the step of adaptively determining an adaptive ICC threshold involves considering more than one evolution of the inter-channel correlation.

For example, the step of adaptively determining the adaptive ICC threshold and the adaptive smoothing of the inter-channel correlation includes, in step S2-1, estimating a relatively slow evolution and a relatively fast evolution of the inter-channel correlation and defining a combined, hybrid evolution of the inter-channel correlation by which changes in the inter-channel correlation are followed relatively quickly if the inter-channel correlation is increasing in time and changes are followed relatively slowly if the inter-channel correlation is decreasing in time.

In this context, the step of determining an adaptive inter-channel correlation threshold based on the adaptive smoothing of the inter-channel correlation also takes the relatively slow evolution and the relatively fast evolution of the inter-channel correlation into account. For example, the adaptive inter-channel correlation threshold may be selected, in step S2-2, as the maximum of the hybrid evolution, the relatively slow evolution and the relatively fast evolution of the inter-channel correlation at the considered time instance.

In another aspect, there is also provided an audio encoding method for encoding a multi-channel audio signal having at least two channels, wherein the audio encoding method comprises a method of determining an inter-channel time difference as described herein.

In yet another aspect, the improved ICTD determination (parameter extraction) can be implemented as a post-processing stage on the decoding side. Consequently, there is also provided an audio decoding method for reconstructing a multi-channel audio signal having at least two channels, wherein the audio decoding method comprises a method of determining an inter-channel time difference as described herein.

For a better understanding, the present technology will now be described in more detail with reference to non-limiting examples.

The present technology relies on an adaptive ICC criterion to extract perceptually relevant ICTD cues.

Cross-correlation is a measure of similarity of two waveforms x[n] and y[n], and may for example be defined in the time domain of index n as:

$$r_{xy}[\tau] = \frac{1}{N}\sum_{n=0}^{N-1}(x[n] \times t[n+\tau]) \quad (1)$$

where τ is the time-lag parameter and N is the number of samples of the considered audio segment. The ICC is normally defined as the maximum of the cross-correlation function which is normalized by the signal energies as:

$$ICC = \max_{\tau=ICTD}\left(\frac{r_{xy}[\tau]}{\sqrt{r_{xx}[0]r_{yy}[0]}}\right) \quad (2)$$

An equivalent estimation of the ICC is possible in the frequency domain by making use of the transforms X and Y (discrete frequency index k) to redefine the cross-correlation function as a function of the cross-spectrum according to:

$$r_{xy}[\tau] = \Re\left(DFT^{-1}\left(\frac{1}{N}X[k] \times Y^*[k]\right)\right) \quad (3)$$

where X[k] is the Discrete Fourier Transform (DFT) of the time domain signal x[n] such as:

$$X[k] = \sum_{n=0}^{N-1} x[n] \times e^{\frac{-2\pi i}{N}kn},\ k = 0, \ldots, N-1 \quad (4)$$

and the $DFT^{-1}$(.) or IDFT(.) is the Inverse Discrete Fourier Transform of the spectrum X usually given by a standard IFFT for Inverse Fast Fourier Transform and * denotes the complex conjugate operation and $\Re$ denotes the real part function.

In equation (2), the time-lag τ maximizing the normalized cross-correlation is selected as a potential ICTD between two signals but until now nothing suggests that this ICTD is actually associated with coherent sound components from both x and y channels.

Procedure Based on Adaptive Limitation

In order to extract and have a potential use of the ICTD, the extracted ICC is used to help the decision. An Adaptive ICC Limitation (AICCL) is computed over analyzed frames of index i by using an adaptive non-linear filtering of the ICC. A simple implementation of the filtering can for example be defined as:

$$AICC[i] = \alpha \times ICC[i] + (1-\alpha) \times AICC[i-1] \quad (5)$$

The AICCL may then be further limited and compensated by a constant value β due to the estimation bias possibly introduced by the cross-correlation estimation technique:

$$AICCL[i] = \max(AICCL_0, AICC[i] - \beta) \quad (6)$$

The constant compensation is only optional and allow for a variable degree of selectivity of the ICTD according to the following:

$$\begin{cases} ICTD[i] = ICTD[i] \mid ICC[i] \geq AICCL[i] \\ ICTD[i] = ICTD[i-1] \mid ICC[i] < AICCL[i] \end{cases}. \quad (7)$$

The additional limitation $AICCL_0$ is used to evaluate the AICCL and can be fixed or estimated according to the knowledge of the acoustical environment i.e. theater with applause, office background noise, etc. Without additional knowledge on the level of noise or more generally speaking on the characteristics of the acoustical environment, a suitable value of $AICCL_0$ has been fixed to 0.75.

A particular set of coefficient that have showed improved accuracy of the extracted ICTD are for example:

$$\begin{cases} \alpha = 0.08 \\ \beta = 0.1 \end{cases} \quad (8)$$

In order to illustrate the behavior of the algorithm, an artificial stereo signal made up of the mixture of speech with recorded fan noise has been generated with a fully controlled ICTD.

FIGS. 7A-D are schematic diagrams illustrating the benefit of using an adaptive ICC limitation AICCL (solid curve of the FIG. 7C) which allows the extraction of a stabilized ICTD (solid curve of the FIG. 7D) even when the acoustical environment is critical, i.e. high level of noise in the stereo mixture.

Figures 7A, 7B, 7C, 7D:
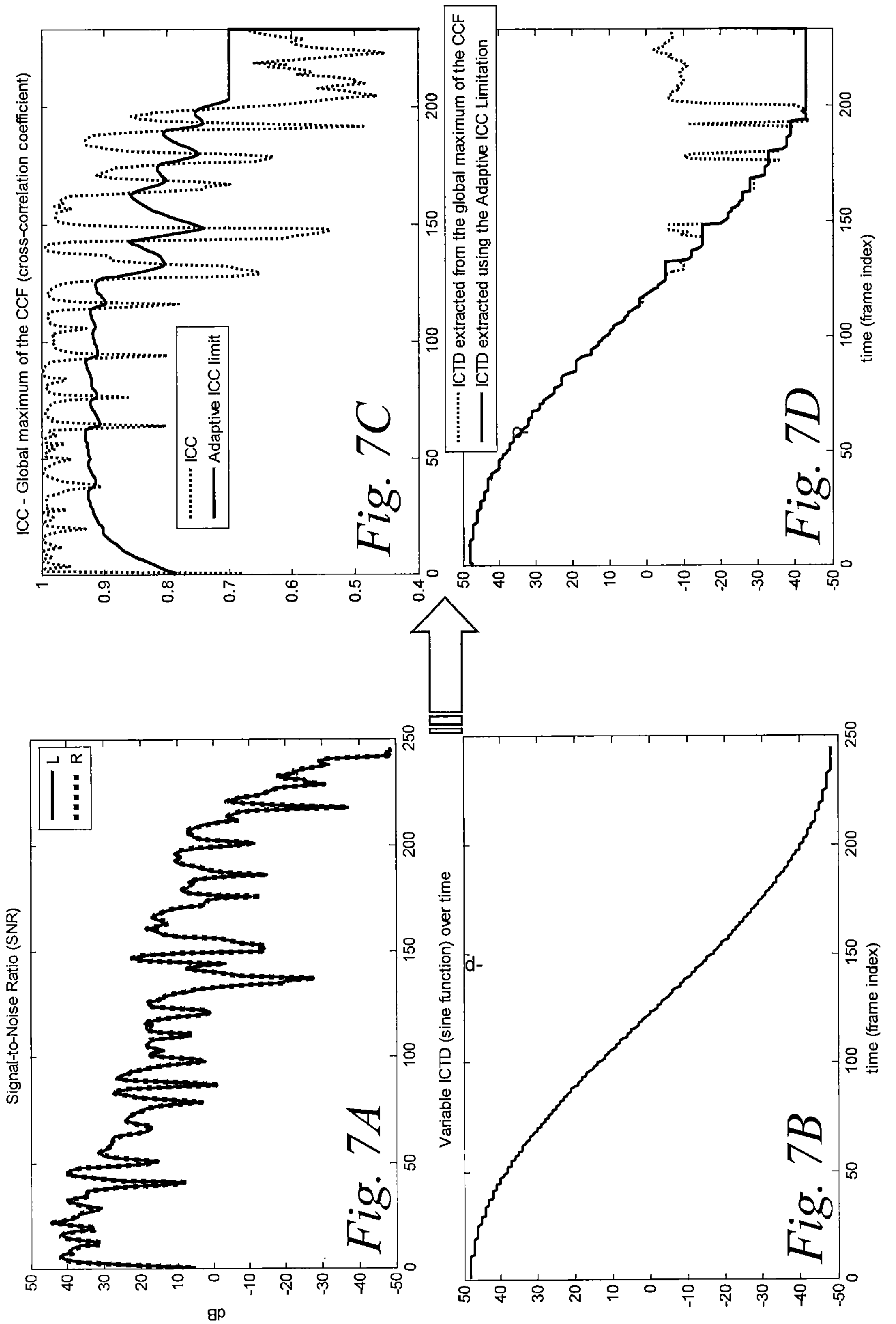
FIGS. 7A-D are schematic diagrams illustrating the benefit of using an adaptive ICC limitation.

FIG. 7A is a schematic diagram illustrating an example of a synthetic stereo signal made up of the sum of a speech signal and stereo fan noise with a progressively decreasing SNR.

FIG. 7B is a schematic diagram illustrating an example of a speech signal artificially delayed on the stereo channel according to the sine function to approximate an ICTD varying from 1 to −1 ms (the sampling frequency fs=48000 Hz).

FIG. 7C is a schematic diagram illustrating an example of the extracted ICC that is progressively decreasing (due to the progressively increasing amount of uncorrelated noise) and also switching from low to high values due to the periods of silence in between the voiced segments. The solid line represents the Adaptive ICC Limitation.

FIG. 7D is a schematic diagram illustrating an example of a superposition of the conventionally extracted ICTD as well as the perceptually relevant ICTD extracted from coherent components.

The selected ICTD according to the AICCL is coherent with the original (true) ICTD. The algorithm is able to stabilize the position of the sources over time rather than following the unstable evolution of the original ICC cue.

Procedure Based on Combined/Hybrid Adaptive Limitation

Another possible derivation of relevant ICC for a perceptually relevant ICTD extraction is described in the following. This alternative computation of relevant ICC requires the estimation of several Adaptive-ICC-Limitations using both slow and fast evolutions of the ICC over time (frame of index i) according to:

$$\begin{cases} AICCs[i] = \alpha_s \times ICC[i] + (1-\alpha_s) \times AICC_s[i-1] \\ AICCf[i] = \alpha_f \times ICC[i] + (1-\alpha_f) \times AICC_f[i-1] \end{cases} \quad (9)$$

A hybrid evolution of the ICC is then defined based on both the slow and fast evolutions of the ICC according to the following criterion. If the ICC is increasing (respectively decreasing) over time then the hybrid and adaptive ICC (AICCh) is quickly (respectively slowly) following the evolution of the ICC. The evolution of the ICC over time is evaluated and indicates how to compute the current (frame of index i) AICCh as follows:

$$\begin{cases} AICCh[i] = \lambda \times \alpha_s \times ICC[i] + (1-\lambda \times \alpha_s) \times AICCh[i-1] & \text{if } (ICC[i] - AICCh[i-1] > 0), \\ AICCh[i] = \alpha_f \times ICC[i] + (1-\alpha_f) \times AICCh[i-1] & \text{otherwise} \end{cases} \quad (10)$$

where a particular example set of parameters suitable for speech signals is given by:

$$\begin{cases} \alpha_s = 0.008 \\ \alpha_f = 0.6 \\ \lambda = 3 \end{cases} \quad (11)$$

where generally $\lambda > 1$ and controls how quickly the evolution is followed.

The hybrid AICC limitation (AICCLh) is then obtained by using:

$$\text{AICCLh}[i] = \max(\text{AICCh}[i], \text{AICCLf}[i]) \quad (12)$$

where the fast AICC limitation (AICCLf) is defined as the maximum between the slow and fast evolutions of the ICC coefficient as follows:

$$\text{AICCLf}[i] = \max(\text{AICCs}[i], \text{AICCf}[i]) \quad (13)$$

Based on this adaptive and hybrid ICC limitation (AICCLh), relevant ICC are defined to allow the extraction of perceptually relevant ICTD according to:

$$\begin{cases} ICTD[i] = ICTD[i] \mid ICC[i] \geq AICCLh[i] \\ ICTD[i] = ICTD[i-1] \mid ICC[i] < AICCLh[i] \end{cases} . \quad (14)$$

Figures 8A, 8B, 8C:
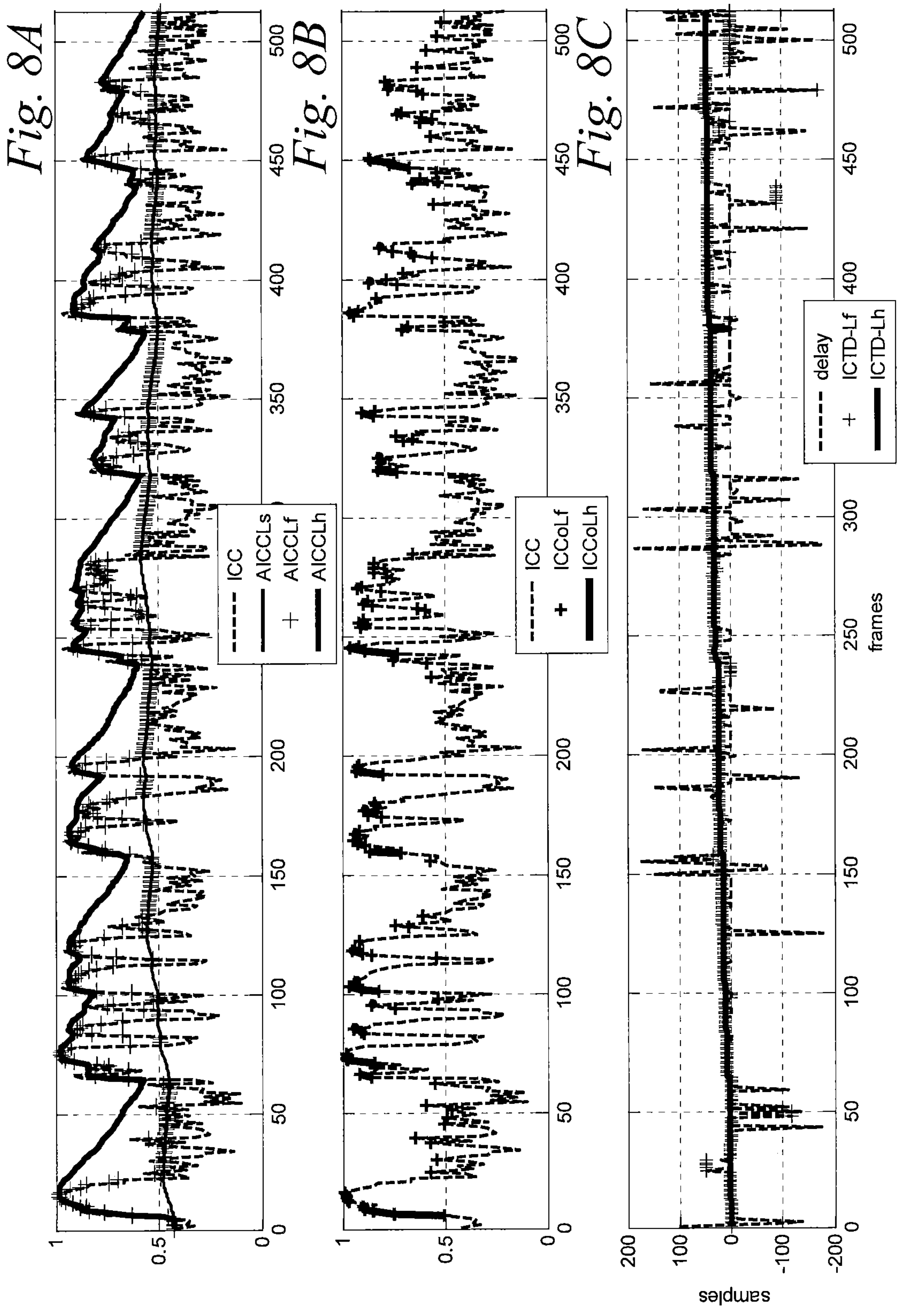
FIGS. 8A-C are schematic diagrams illustrating the benefit of using the combination of a slow and fast adaptation of the ICC over time to extract a perceptually relevant ICTD.

FIGS. 8A-C are schematic diagrams illustrating the benefit of using the combination of a slow and fast adaptation of the ICC over time to extract a perceptually relevant ICTD between the stereo channel of critical speech signals in terms of noisy environment, reverberant room, and so forth. In this example, the analyzed stereo signal is a moving speech source (from the center to the right of the stereo image) in a noisy office environment recorded with an AB microphone. In this particular stereo signal, the speech is recorded in a noisy office environment (keyboard, fan, . . . noises).

FIG. 8A is a schematic diagram illustrating an example of a superposition of the ICC and its slow (AICCLs) and fast evolution (AICCLf) over frames. The hybrid adaptive ICC limitation (AICCLh) is based on both AICCLs and AICCLf.

FIG. 8B is a schematic diagram illustrating an example of segments (indicated by crosses and solid line segments) for which ICC values will be used to extract a perceptually relevant ICTD. ICCoL stands for ICC over Limit while f stands for fast and h for hybrid.

FIG. 8C is a schematic diagram in which the dotted line represents the basic conventional delay extraction by maximization of the CCF without any specific processing. The crosses and the solid line refers to the extracted ICTD when the ICC is higher than the AICCLf and AICCLh, respectively.

Without any specific processing of the ICC, the extracted ICTD (dotted line in FIG. 8C) is very unstable due to the background noise, the directional noise or secondary sources coming from the keyboards does not need to be extracted at least not when the speech is active and the dominant source. The proposed algorithm/procedure is able to derive a more accurate estimation of the ICTD related to the directional and dominant speech source of interest.

The above procedures are described for a frame-by-frame analysis scheme (frame of index i) but can also be used and deliver similar behavior and results for a scheme in the frequency domain with several analysis sub-bands of index b. In that case, the CCF may be defined for each frame and each sub-band being a subset of the spectrum defined in the equation (3) i.e. $b=\{k, k_b<k<(k_b+1)\}$ where $k_b$ are the boundaries of the frequency sub-bands. The algorithm/procedure is normally independently applied to each analyzed sub-band according to equation (2) and the corresponding $r_{xy}[i,b]$. This way the improved ICTD can also be extracted in the time-frequency domain defined by the grid of indices i and b.

The present technology may be devised so that it is not introducing any additional complexity nor delay but increasing the quality of the decoded/rendered/up-mixed multi-channel audio signal due to the decreased sensitivity to noise, reverberation and background/secondary sources.

The present technology allows a more precise localization estimate of the dominant source within each frequency sub-band due to a better extraction of both the ICTD and ICLD cues. The stabilization of the ICTD from channels with characterized coherence has been illustrated above. The same benefit occurs for the extraction of the ICLD when the channels are aligned in time.

In the context of multi-channel audio rendering, the down- or up-mix are very common processing techniques.

The current algorithm allows the generation of coherent down-mix signal post alignment, i.e. time delay—ICTD—compensation.

FIGS. 9A-C are schematic diagrams illustrating an example of how alignment of the input channels according to the ICTD can avoid the comb-filtering effect and energy loss during the down-mix procedure, e.g. from 2-to-1 channel or more generally speaking from N-to-M channels where (N≥2) and (M≤2). Both full-band (in the time-domain) and sub-band (frequency-domain) alignments are possible according to implementation considerations.

FIG. 9A is a schematic diagram illustrating an example of a spectrogram of the down-mix of incoherent stereo channels, where the comb-filtering effect can be observed as horizontal lines.

FIG. 9B is a schematic diagram illustrating an example of a spectrogram of the aligned down-mix, i.e. sum of the aligned/coherent stereo channels.

FIG. 9C is a schematic diagram illustrating an example of a power spectrum of both down-mix signals. There is a large comb-filtering in case the channels are not aligned which is equivalent to energy losses in the mono down-mix.

When the ICTD is used for spatial synthesis purposes the current method allows a coherent synthesis with a stable spatial image. The spatial positions of the reconstructed source are not floating in space since no smoothing of the ICTD is used. Indeed the proposed algorithm/procedure may select the current ICTD because it is considered as extracted from coherent sound components or preserve the position of the sources in the previous analyzed segment (frame or block) in order to stabilize the spatial image i.e. no perturbation of the spatial image when the extracted ICTD is related to incoherent components.

In a related aspect, there is provided a device for determining an inter-channel time difference of a multi-channel audio signal having at least two channels. With reference to the illustrative block diagram of FIG. 10 it can be seen that the device 30 comprises an inter-channel correlation, ICC, determiner 32, an adaptive filter 33, a threshold determiner 34, an inter-channel correlation, ICC, evaluator 35 and an inter-channel time difference, ICTD, determiner 38.

The inter-channel correlation, ICC, determiner 32 is configured to determine, at a number of consecutive time instances, inter-channel correlation based on a cross-correlation function involving at least two different channels of the multi-channel input signal.

This could for example be a cross-correlation function of two or more different channels, normally a pair of channels, but could also be a cross-correlation function of different combinations of channels. More generally, this could be a cross-correlation function of a set of channel representations including at least a first representation of one or more channels and a second representation of one or more channels, as long as at least two different channels are involved overall.

Each value of the inter-channel correlation is associated with a corresponding value of the inter-channel time difference.

The adaptive filter 33 is configured to perform adaptive smoothing of the inter-channel correlations in time, and the threshold determiner 34 is configured to adaptively determine an adaptive inter-channel correlation threshold based on the adaptive smoothing of the inter-channel correlation.

The inter-channel correlation, ICC, evaluator 34 is configured to evaluate a current value of inter-channel correlation in relation to the adaptive inter-channel correlation threshold to determine whether the corresponding current value of the inter-channel time difference is relevant.

The inter-channel time difference, ICTD, determiner 38 is configured to determine an updated value of the inter-channel time difference based on the result of this evaluation. The ICTD determiner 37 may use information from the ICC determiner 32 or the original multi-channel input signal when determining ICTD values corresponding to the ICC values of the ICC determiner.

It is common that one or more channel pairs of the multi-channel signal are considered, and there is then normally a CCF for each pair of channels and an adaptive threshold for each analyzed pair of channels. More generally, there is a CCF and an adaptive threshold for each considered set of channel representations.

If the current value of the inter-channel time difference is determined to be relevant, the current value will normally be taken into account when determining the updated value of the inter-channel time difference. If the current value of the inter-channel time difference is not relevant, it should normally not be used when determining the updated value of the inter-channel time difference. In other words, the purpose of the evaluation in relation to the adaptive inter-channel correlation threshold, as performed by the ICC evaluator, is typically to determine whether or not the current value of the inter-channel time difference should be used by the ICTD determiner when establishing the updated ICTD value. This means that the ICC evaluator 35 is configured to evaluate the current value of inter-channel correlation in relation to the adaptive inter-channel correlation threshold to determine whether or not the current value of the inter-channel time difference should be used by the ICTD determiner 38 when determining the updated value of the inter-channel time difference. The ICTD determiner 38 is then preferably configured for taking, if the current value of the inter-channel time difference is determined to be relevant, the current value into account when determining the updated value of the inter-channel time difference. The ICTD determiner 38 is preferably configured to determine, if the current value of the inter-channel time difference is determined to not be relevant, the updated value of the inter-channel time difference based on one or more previous values of the inter-channel time difference.

In this way, improved stability of the inter-channel time difference is obtained.

For example, when the current inter-channel correlation is low (i.e. below the adaptive threshold), it is generally not desirable to use the corresponding current inter-channel time difference. However, when the correlation is high (i.e. above the adaptive threshold), the current inter-channel time difference should be taken into account when updating the inter-channel time difference.

The device can implement any of the previously described variations of the method for determining an inter-channel time difference of a multi-channel audio signal.

For example, the ICTD difference determiner 38 may be configured to select the current value of the inter-channel time difference as the updated value of the inter-channel time difference.

Alternatively, the ICTD determiner 38 may be configured to determine the updated value of the inter-channel time difference based on the current value of the inter-channel time difference together with one or more previous values of the inter-channel time difference. For example, the ICTD determiner 38 is configured to determine a combination of several inter-channel time difference values according to the values of the inter-channel correlation, with a weight applied to each inter-channel time difference value being a function of the inter-channel correlation at the same time instant.

By way of example, the adaptive filter 33 is configured to estimate a relatively slow evolution and a relatively fast evolution of the inter-channel correlation and define a combined, hybrid evolution of the inter-channel correlation by which changes in the inter-channel correlation are followed relatively quickly if the inter-channel correlation is increasing in time and changes are followed relatively slowly if the inter-channel correlation is decreasing in time. In this aspect, the threshold determiner 34 may then be configured to select the adaptive inter-channel correlation threshold as the maximum of the hybrid evolution, the relatively slow evolution and the relatively fast evolution of the inter-channel correlation at the considered time instance.

The adaptive filter 33, the threshold determiner 34, the ICC evaluator 35 and optionally also the ICC determiner 32 may be considered as unit 37 for adaptive ICC computations.

Figure 1:
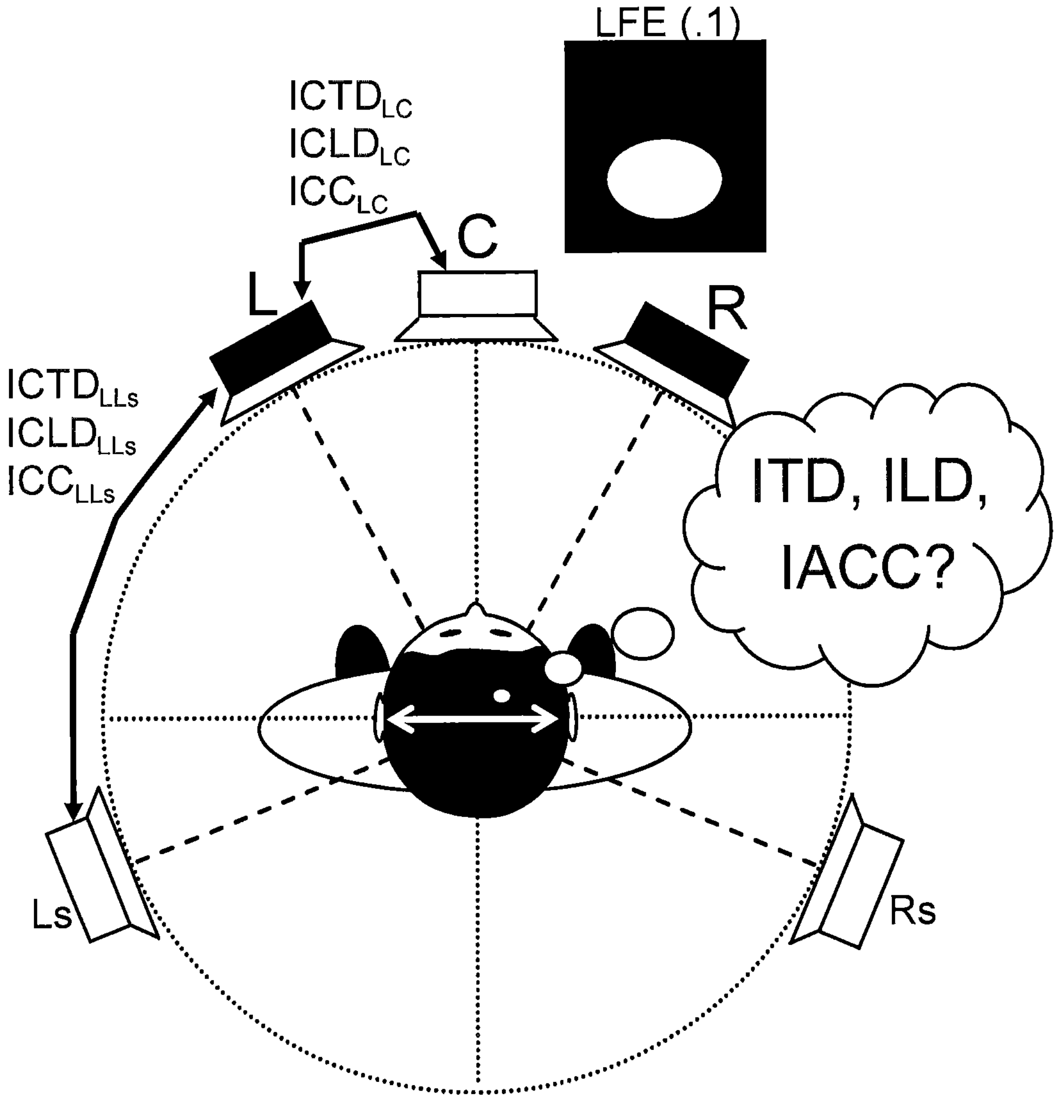
FIG. 1 is a schematic diagram illustrating an example of spatial audio playback with a 5.1 surround system.
Figure 2:
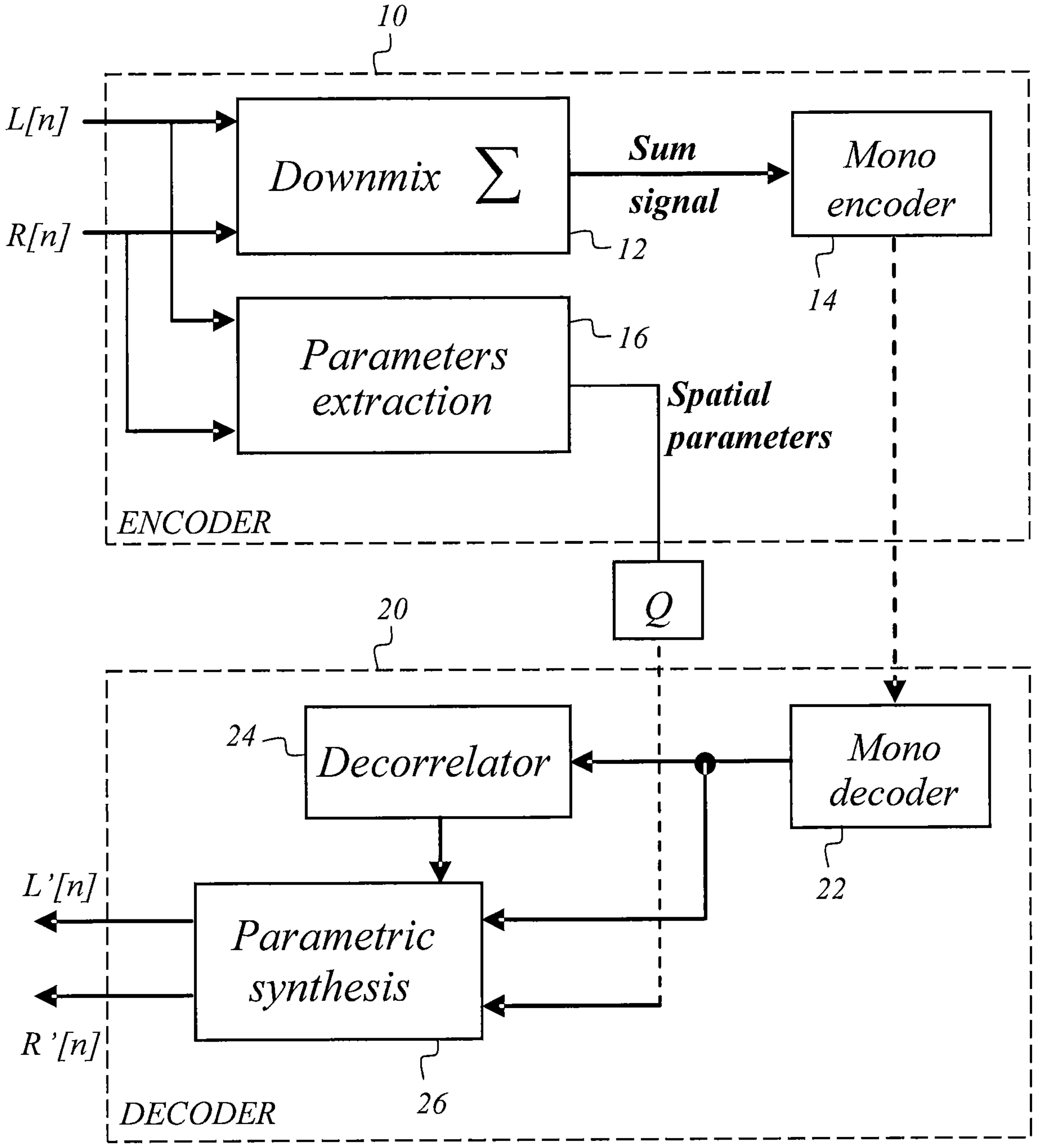
FIG. 2 is a schematic block diagram showing parametric stereo encoding/decoding as an illustrative example of multi-channel audio encoding/decoding.
Figure 3A:
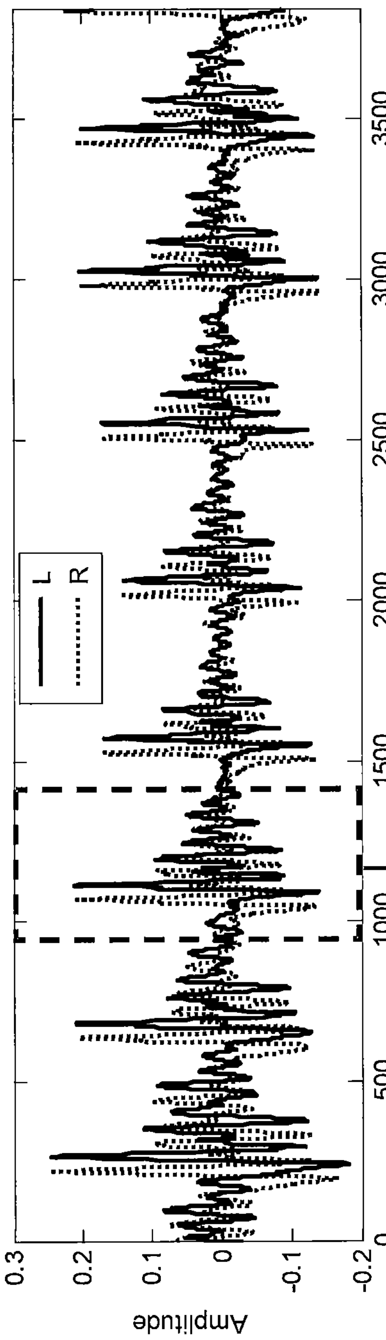
FIG. 3A is a schematic diagram illustrating an example of the waveforms for the left and right channels for "clean speech".
Figure 3B:
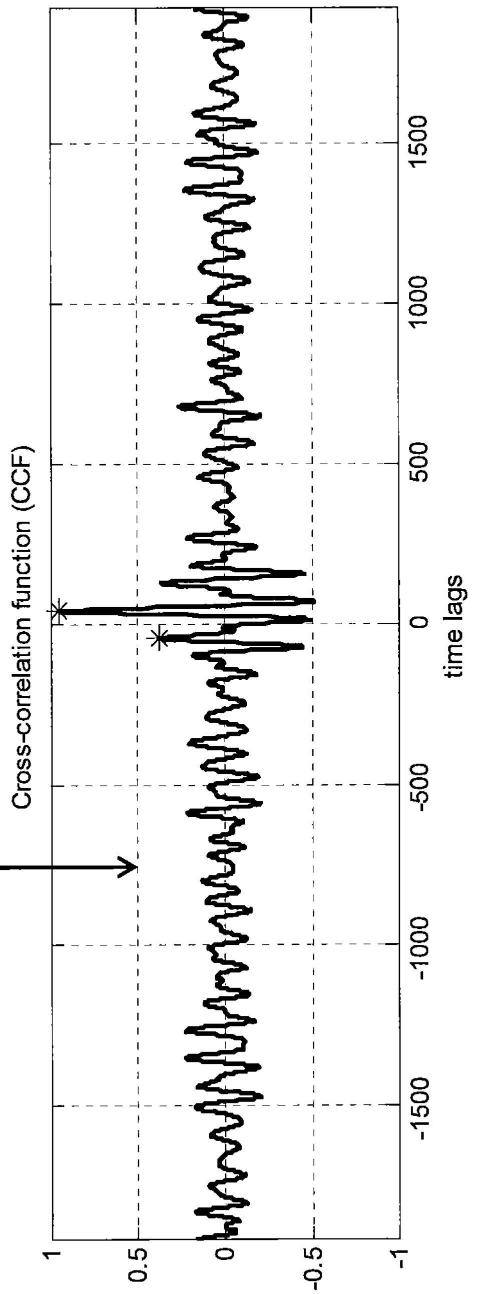
FIG. 3B is a schematic diagram illustrating a corresponding example of the Cross-Correlation Function between a portion of the left and right channels.
Figure 4A:
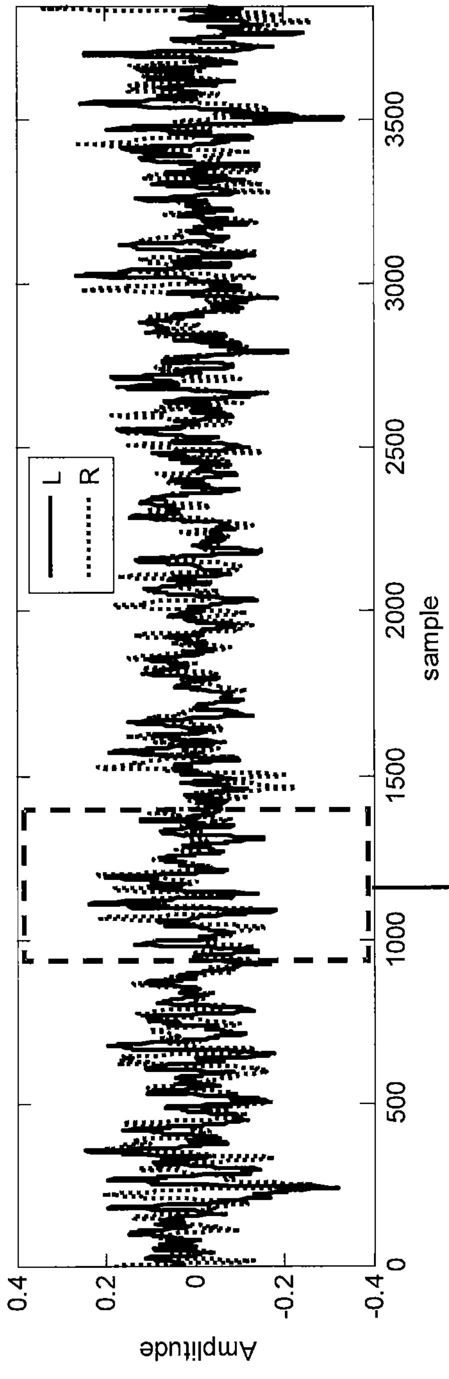
FIG. 4A is a schematic diagram illustrating an example of the waveforms for the left and right channels made up of a mixture of clean speech and artificial noise.
Figure 4B:
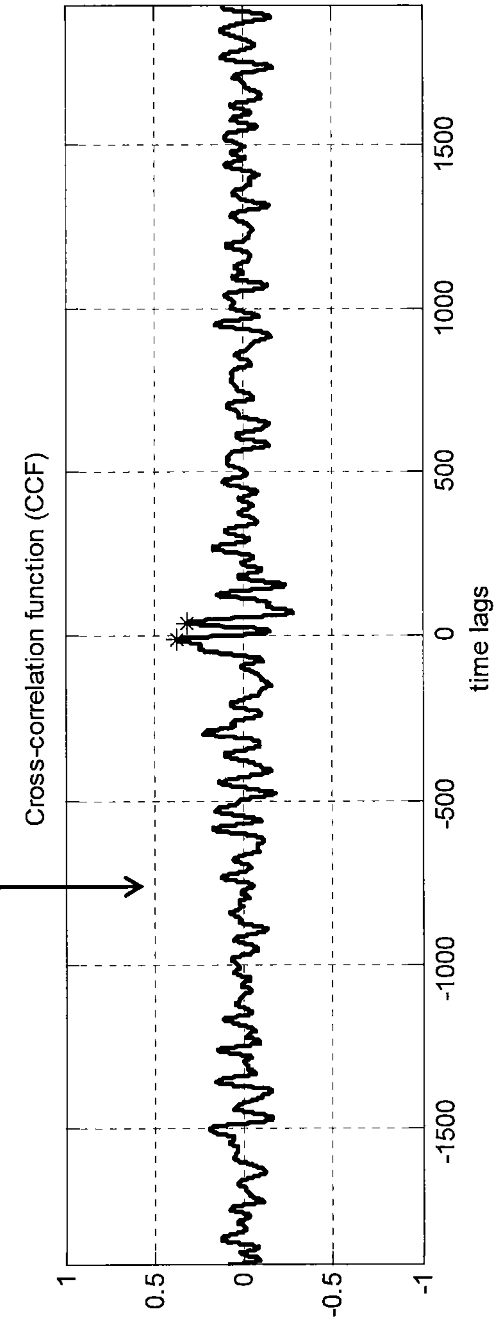
FIG. 4B is a schematic diagram illustrating a corresponding example of the Cross-Correlation Function between a portion of the left and right channels.

In another aspect, there is provided an audio encoder configured to operate on signal representations of a set of input channels of a multi-channel audio signal having at least two channels, wherein the audio encoder comprises a device configured to determine an inter-channel time difference as described herein. By way of example, the device 30 for determining an inter-channel time difference of FIG. 10 may be included in the audio encoder of FIG. 2. It should be understood that the present technology can be used with any multi-channel encoder.

In still another aspect, there is provided an audio decoder for reconstructing a multi-channel audio signal having at least two channels, wherein the audio decoder comprises a device configured to determine an inter-channel time difference as described herein. By way of example, the device 30 for determining an inter-channel time difference of FIG. 10 may be included in the audio decoder of FIG. 2. It should be understood that the present technology can be used with any multi-channel decoder.

Figure 11:
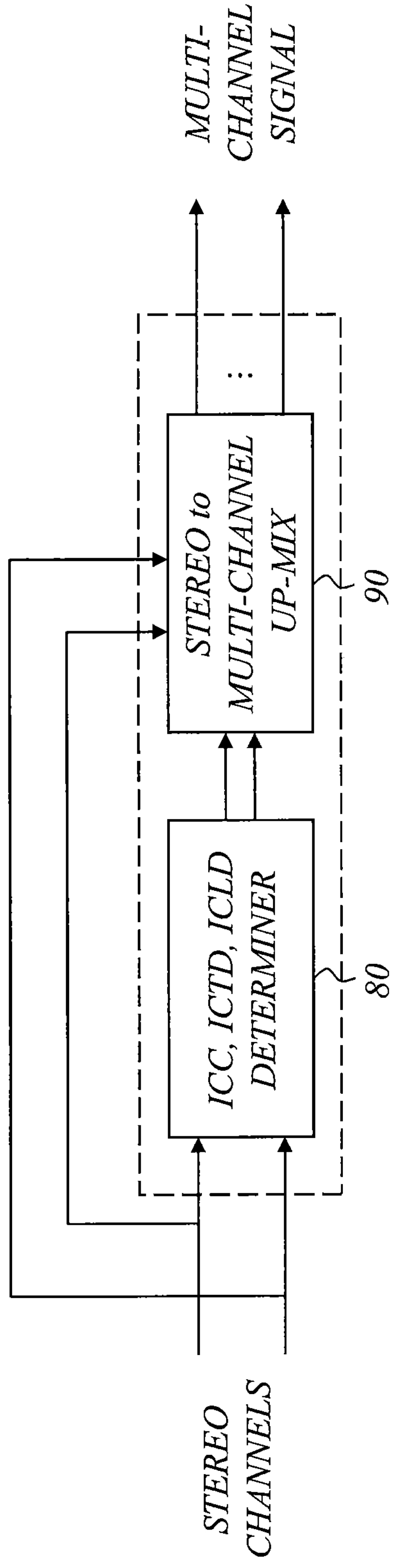
FIG. 11 is a schematic diagram illustrating an example of a decoder including extraction of an improved set of spatial cues (ICC, ICTD and/or ICLD) combined with up-mixing into a multi-channel signal.

In the situation where a legacy stereo decoding is performed for example with a dual-mono decoder (independently decoded mono channels) or in any other situation delivering stereo channels, as illustrated in FIG. 11, these stereo channels can be extended or up-mixed into a multi-channel audio signal of N channels where N>2. Conventional up-mix methods are existing and already available. The present technology can be used in combination with and/or prior to any of these up-mix methods in order to provide an improved set of spatial cues ICC, ICTD and/or ICLD. For example, as illustrated in FIG. 11, the decoder includes an ICC, ICTD, ICLD determiner 80 for extraction of an improved set of spatial cues (ICC, ICTD and/or ICLD) combined with a stereo to multi-channel up-mix unit 90 for up-mixing into a multi-channel signal.

Figure 12:
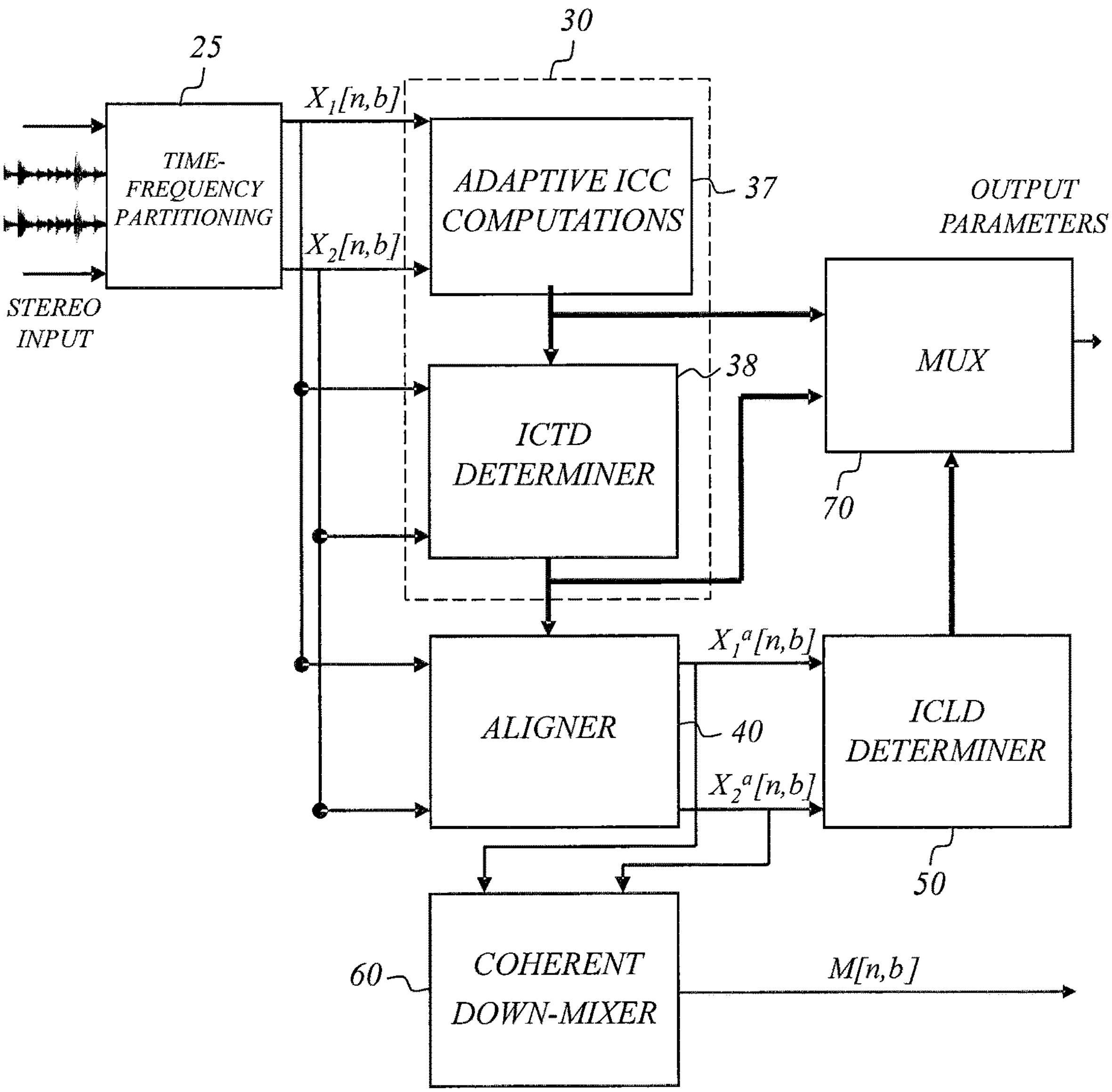
FIG. 12 is a schematic block diagram illustrating an example of a parametric stereo encoder with a parameter adaptation in the exemplary case of stereo audio according to an embodiment.

FIG. 12 is a schematic block diagram illustrating an example of a parametric stereo encoder with a parameter adaptation in the exemplary case of stereo audio according to an embodiment. The present technology is not limited to stereo audio, but is generally applicable to multi-channel audio involving two or more channels. The overall encoder includes an optional time-frequency partitioning unit 25, a unit 37 for adaptive ICC computations, an ICTD determiner 38, an optional aligner 40, an optional ICLD determiner 50, a coherent down-mixer 60 and a multiplexer MUX 70.

The unit 37 for adaptive ICC computations is configured for determining ICC, performing adaptive smoothing and determining an adaptive ICC threshold and ICC evaluation relative to the adaptive ICC threshold. The determined ICC may be forwarded to the MUX 70.

Figure 10:
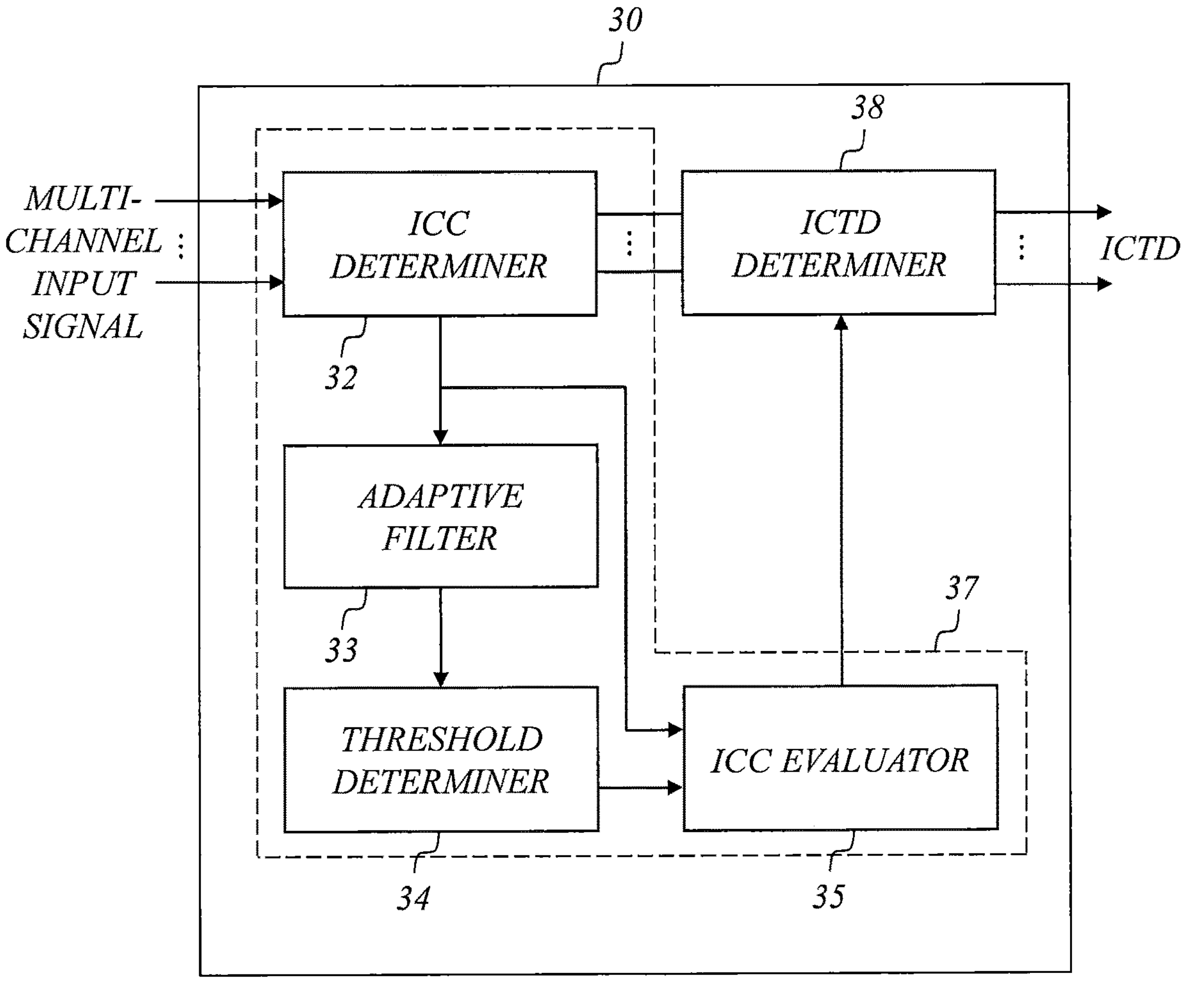
FIG. 10 is a schematic block diagram illustrating an example of a device for determining an inter-channel time difference of a multi-channel audio signal having at least two channels according to an embodiment.

The unit 37 for adaptive ICC computations of FIG. 12 basically corresponds to the ICC determiner 32, the adaptive filter 33, the threshold determiner 34, and the ICC evaluator 35 of FIG. 10.

The unit 37 for adaptive ICC computations and the ICTD determiner 38 basically corresponds to the device 30 for determining inter-channel time difference.

The ICTD determiner 38 determines or extracts a relevant ICTD based on the ICC evaluation, and the extracted parameters are forwarded to a multiplexer MUX 70 for transfer as output parameters to the decoding side.

The aligner 40 performs alignment of the input channels according to the relevant ICTD to avoid the comb-filtering effect and energy loss during the down-mix procedure by the coherent down-mixer 60. The aligned channels may then be used as input to the ICLD determiner 50 to extract a relevant ICLD, which is forwarded to the MUX 70 for transfer as part of the output parameters to the decoding side.

It will be appreciated that the methods and devices described above can be combined and re-arranged in a variety of ways, and that the methods can be performed by one or more suitably programmed or configured digital signal processors and other known electronic circuits (e.g. discrete logic gates interconnected to perform a specialized function, or application-specific integrated circuits).

Many aspects of the present technology are described in terms of sequences of actions that can be performed by, for example, elements of a programmable computer system.

User equipment embodying the present technology include, for example, mobile telephones, pagers, headsets, laptop computers and other mobile terminals, and the like.

The steps, functions, procedures and/or blocks described above may be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

It should also be understood that it may be possible to re-use the general processing capabilities of any device in which the present technology is implemented. It may also be possible to re-use existing software, e.g. by reprogramming of the existing software or by adding new software components.

Figure 13:
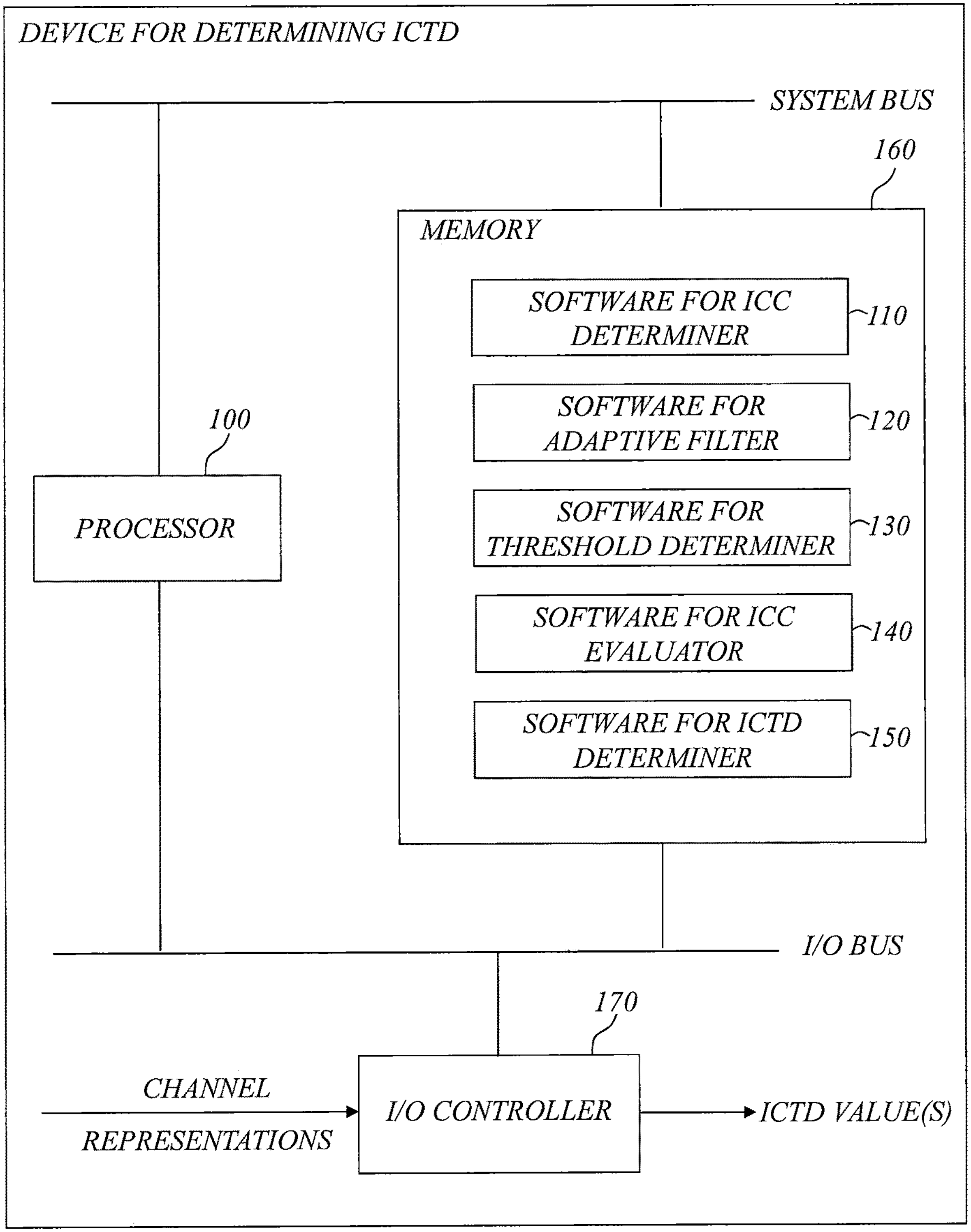
FIG. 13 is a schematic block diagram illustrating an example of a computer-implementation according to an embodiment.

In the following, an example of a computer-implementation will be described with reference to FIG. 13. This embodiment is based on a processor 100 such as a micro processor or digital signal processor, a memory 160 and an input/output (I/O) controller 170. In this particular example, at least some of the steps, functions and/or blocks described above are implemented in software, which is loaded into memory 160 for execution by the processor 100. The processor 100 and the memory 160 are interconnected to each other via a system bus to enable normal software execution. The I/O contoller 170 may be interconnected to the processor 100 and/or memory 160 via an I/O bus to enable input and/or output of relevant data such as input parameter(s) and/or resulting output parameter(s).

In this particular example, the memory 160 includes a number of software components 110-150. The software component 110 implements an ICC determiner corresponding to block 32 in the embodiments described above. The software component 120 implements an adaptive filter corresponding to block 33 in the embodiments described above, The software component 130 implements a threshold determiner corresponding to block 34 in the embodiments described above. The software component 140 implements an ICC evaluator corresponding to block 35 in the embodiments described above. The software component 150 implements an ICTD determiner corresponding to block 38 in the embodiments described above.

The I/O controller 170 is typically configured to receive channel representations of the multi-channel audio signal and transfer the received channel representations to the processor 100 and/or memory 160 for use as input during execution of the software. Alternatively, the input channel representations of the multi-channel audio signal may already be available in digital form in the memory 160.

The resulting ICTD value(s) may be transferred as output via the I/O controller 170. If there is additional software that needs the resulting ICTD value(s) as input, the ICTD value can be retrieved directly from memory.

Moreover, the present technology can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

The software may be realized as a computer program product, which is normally carried on a non-transitory computer-readable medium, for example a CD, DVD, USB memory, hard drive or any other conventional memory device. The software may thus be loaded into the operating memory of a computer or equivalent processing system for execution by a processor. The computer/processor does not have to be dedicated to only execute the above-described steps, functions, procedure and/or blocks, but may also execute other software tasks.

The embodiments described above are to be understood as a few illustrative examples of the present technology. It will be understood by those skilled in the art that various modifications, combinations and changes may be made to the embodiments without departing from the scope of the present technology. In particular, different part solutions in the different embodiments can be combined in other configurations, where technically possible. The scope of the present technology is, however, defined by the appended claims.

ABBREVIATIONS

AICC Adaptive ICC
AICCL Adaptive ICC Limitation
CCF Cross-Correlation Function
ERB Equivalent Rectangular Bandwidth
GCC Generalized Cross-Correlation
ITD Interaural Time Difference
ICTD Inter-Channel Time Difference
ILD Interaural Level Difference
ICLD Inter-Channel Level Difference
ICC Inter-Channel Coherence
TDE Time Domain Estimation
DFT Discrete Fourier Transform
IDFT Inverse Discrete Fourier Transform
IFFT Inverse Fast Fourier Transform
DSP Digital Signal Processor
FPGA Field Programmable Gate Array
PLC Programmable Logic Controller

REFERENCES

[1] C. Tournery, C. Faller, *Improved Time Delay Analysis/Synthesis for Parametric Stereo Audio Coding*, AES $120^{th}$, Proceeding 6753, Paris, May 2006.

[2] C. Faller, "Parametric coding of spatial audio", PhD thesis, Chapter 7, Section 7.2.3, pages 113-114.

The invention claimed is:

1. A method for determining an inter-channel time difference of a multi-channel audio signal having at least two channels, wherein the method comprising:
- determining, at a number of consecutive time instances, an inter-channel correlation; and
- determining an updated value of the inter-channel time difference based on an evaluation of a current value of inter-channel correlation.

2. The method of claim 1, wherein each value of the inter-channel correlation is associated with a corresponding value of the inter-channel time difference.

3. The method of claim 1, further comprising:
- evaluating a current value of inter-channel correlation to determine whether a current corresponding value of the inter-channel time difference is associated with the updated value of the inter-channel time difference,
- wherein evaluating a current value of inter-channel correlation is performed to determine whether or not the current value of the inter-channel time difference is used when determining the updated value of the inter-channel time difference.

4. The method of claim 1, wherein determining an updated value of the inter-channel time difference comprises taking, responsive to a current value of the inter-channel time difference being determined to be associated with the updated value of the inter-channel time difference, the current value into account when determining the updated value of the inter-channel time difference.

5. The method of claim 4, wherein taking the current value into account when determining the updated value of the inter-channel time difference comprises selecting the current value of the inter-channel time difference as the updated value of the inter-channel time difference.

6. The method of claim 4, wherein taking the current value into account when determining the updated value of the inter-channel time difference comprises using the current value of the inter-channel time difference together with one or more previous values of the inter-channel time difference to determine the updated value of the inter-channel time difference.

7. The method of claim 6, wherein using the current value of the inter-channel time difference together with one or more previous values of the inter-channel time difference to determine the updated value of the inter-channel time difference comprises determining a combination of several inter-channel time difference values according to the values of the inter-channel correlation, with a weight applied to each inter-channel time difference value being a function of the inter-channel correlation at the same time instant.

8. The method of claim 1, wherein determining an updated value of the inter-channel time difference comprises using, in response to a current value of the inter-channel time difference being determined to not be associated with the updated value of the inter-channel time difference, one or more previous values of the inter-channel time difference for determining the updated value of the inter-channel time difference.

9. An audio encoding method comprising the method for determining an inter-channel time difference according to claim 1.

10. An audio decoding method comprising the method for determining an inter-channel time difference according to claim 1.

11. A device for determining an inter-channel time difference of a multi-channel audio signal having at least two channels, wherein the device comprises:

at least one processor; and at least one memory storing program code that is executable by the at least one processor to perform operations comprising:

determining an updated value of the inter-channel time difference based on the result of an evaluation of a current value of inter-channel correlation.

12. The device of claim 11, wherein each value of the inter-channel correlation is associated with a corresponding value of the inter-channel time difference.

13. An audio system comprising:

an encoder comprising:

a downmix unit configured to downmix stereo channels to form a sum signal;

a mono encoder communicatively coupled to the downmix unit and configured to encode the sum signal; and a parameters extraction unit configured to extract spatial quantized parameters from the stereo channels;

a decoder coupled to the encoder and comprising:

a mono decoder communicatively coupled to the mono encoder and configured to decode a mono signal from the sum signal;

a decorrelator communicatively coupled to the mono decoder and configured to determine a decorrelated version of the mono signal; and a parametric synthesis unit communicatively coupled to the parameters extraction unit, mono decoder, and the decorrelator and configured to form a multi-channel audio signal having at least two channels using a spatial synthesis based on the mono signal, the spatial quantized parameters, and the decorrelated version of the mono signal;

a processor; and a memory coupled to the processor having instructions stored therein that are executable by the processor to cause the processor to perform operations, the operations comprising:

evaluating a current value of inter-channel correlation to determine whether a current corresponding value of the inter-channel time difference is associated with an updated value of the inter-channel time difference.

14. The audio system of claim 13, the operations further comprising:

determining, at a number of consecutive time instances, an inter-channel correlation; and determining the updated value of an inter-channel time difference based on the result of the evaluation, wherein each value of the inter-channel correlation is associated with a corresponding value of the inter-channel time difference.

15. The audio system of claim 14, wherein evaluating a current value of inter-channel correlation is performed to determine whether or not the current value of the inter-channel time difference is used when determining the updated value of the inter-channel time difference.

16. The audio system of claim 14, wherein determining an updated value of the inter-channel time difference comprises taking, responsive to a current value of the inter-channel time difference being determined to be associated with the updated value of the inter-channel time difference, the current value into account when determining the updated value of the inter-channel time difference.

17. The audio system of claim 16, wherein taking the current value into account when determining the updated value of the inter-channel time difference comprises selecting the current value of the inter-channel time difference as the updated value of the inter-channel time difference.

18. The audio system of claim 14, wherein taking the current value into account when determining the updated value of the inter-channel time difference comprises using the current value of the inter-channel time difference together with one or more previous values of the inter-channel time difference to determine the updated value of the inter-channel time difference.

19. The audio system of claim 18, wherein using the current value of the inter-channel time difference together with one or more previous values of the inter-channel time difference to determine the updated value of the inter-channel time difference comprises determining a combination of several inter-channel time difference values according to the values of the inter-channel correlation, with a weight applied to each inter-channel time difference value being a function of the inter-channel correlation at the same time instant.

20. The audio system of claim 14, wherein determining an updated value of the inter-channel time difference comprises using, in response to a current value of the inter-channel time difference being determined to not be associated with the updated value of the inter-channel time difference, one or more previous values of the inter-channel time difference for determining the updated value of the inter-channel time difference.

* * * * *